United States Patent
Das et al.

(10) Patent No.: US 12,413,093 B2
(45) Date of Patent: Sep. 9, 2025

(54) ENGINE SYSTEM AND METHODS FOR DISPATCHING AND CONTROLLING DISTRIBUTED ENERGY RESOURCES

(71) Applicant: Eaton Intelligent Power Limited, Dublin (IE)

(72) Inventors: Debasmita Das, Bangalore (IN); Pranavamoorthy Balasubramanian, Pune (IN); Qiang Fu, Arvada, CO (US); Chaitanya Baone, Fremont, CA (US)

(73) Assignee: Eaton Intelligent Power Limited, Dublin (IE)

( * ) Notice: Subject to any disclaimer, the term of this patent is extended or adjusted under 35 U.S.C. 154(b) by 733 days.

(21) Appl. No.: 17/672,206

(22) Filed: Feb. 15, 2022

(65) Prior Publication Data

US 2023/0261518 A1     Aug. 17, 2023

(51) Int. Cl.
*H02J 13/00* (2006.01)
*H02J 3/38* (2006.01)

(52) U.S. Cl.
CPC ........ *H02J 13/00004* (2020.01); *H02J 3/381* (2013.01); *H02J 2300/10* (2020.01)

(58) Field of Classification Search
CPC ... H02J 13/00004; H02J 3/381; H02J 2300/10
See application file for complete search history.

(56) References Cited

U.S. PATENT DOCUMENTS

| | | | |
|---|---|---|---|
| 9,564,757 B2 | 2/2017 | Wang et al. | |
| 10,324,483 B2 | 6/2019 | EIBsat | |
| 10,684,636 B2 | 6/2020 | Wong et al. | |
| 11,159,044 B2 | 10/2021 | Lian et al. | |
| 2011/0035073 A1 | 2/2011 | Ozog | |
| 2015/0134135 A1 | 5/2015 | Wong et al. | |
| 2016/0323736 A1 | 11/2016 | Donahue et al. | |
| 2019/0044333 A1 | 2/2019 | Martinez | |
| 2019/0165580 A1* | 5/2019 | Doherty | H02J 3/003 |

(Continued)

FOREIGN PATENT DOCUMENTS

CN     110341690 B     8/2020

OTHER PUBLICATIONS

Karmiris et al., "Peak Shaving Control Method for Energy Storage," Corporate Research Center: Vasterås, Sweden, pp. 1-6 (2013), https://www.sandia.gov/ess-ssl/EESAT/2013_papers/Peak_Shaving_Control_Method_for_Energy_Storage.pdf.

(Continued)

*Primary Examiner* — Robert E Fennema
*Assistant Examiner* — Yvonne Trang Follansbee
(74) *Attorney, Agent, or Firm* — Baker Botts L.L.P.

(57) ABSTRACT

An engine system and methods for dispatching and controlling a plurality of distributed energy resources, e.g., a plurality of microgrids, involving: a server; a controller configured to operably couple with the server and the plurality of DERs; and at least one processor configured to operably couple with the server and the controller, the at least one processor configured to operate the server and the controller in an online mode and an offline mode, whereby at least one of forecast information and real-time information is providable, operational expense is reducible, and at least one new revenue generation avenue is establishable.

20 Claims, 11 Drawing Sheets

(56) References Cited

U.S. PATENT DOCUMENTS

2019/0326755 A1* 10/2019 Fu .................... H02J 13/00002
2020/0004212 A1   1/2020 Fife
2020/0059098 A1   2/2020 Dong et al.
2020/0153274 A1   5/2020 Munz et al.
2020/0379494 A1  12/2020 Wong et al.

OTHER PUBLICATIONS

Prasatsap et al., "Determination of Optimal Energy Storage System for Peak Shaving to Reduce Electricity Cost in a University," 2017 International Conference on Alternative Energy in Developing Countries and Emerging Economies, 2017 Aedcee, V. 138, pp. 967-972, (May 25, 2017).

Martins et al., "Optimal Component Sizing for Peak Shaving in Battery Energy Storage System for Industrial Applications," Energies 2018, V. 11, Issue 2048, pp. 1-22 (Aug. 7, 2018), www.mdpi.com/journal/energies, https://www.mdpi.com/1996-1073/11/8/2048.

* cited by examiner

ENGINE SYSTEM AND METHODS FOR DISPATCHING AND CONTROLLING DISTRIBUTED ENERGY RESOURCES

FIELD

Generally, the present disclosure relates to microgrid technologies. More particularly, the present disclosure relates to optimization of microgrid technologies.

BACKGROUND

In the related art, a distributed energy resource management system (DERMS), is a software platform used to manage a group of distributed energy resource (DER) assets, e.g., photovoltaic (PV) solar panels, behind-the-meter batteries, and a fleet of electric vehicles (EVs), for delivering power grid services and for balancing demand with supply, in relation to utility entities. The aggregation of distributed energy resources (DERs) has been used to support frequency, support voltage, shift load, and provide emergency demand response in relation to a grid. Currently, many utility entities manage DERs through a relatively manual process.

A related art microgrid is a decentralized group of electricity sources and loads that normally operates, is connected to, and synchronous with, a related art wide-area synchronous grid, e.g., a grid or a macrogrid. However, a microgrid is disconnectable from the grid and can autonomously function in an "island mode" as technical conditions, or economic conditions may require. Thus, microgrids improve the security of power supply within a microgrid cell and can supply emergency power by switching between an island mode and a grid-connected mode.

Further, a DERMS establishes a symbiotic relationship between a utility entity and its customers. Typically, a host or a customer has a microgrid backup power. When the microgrid is not in use by the customer, the microgrid serves the grid through utility management. However, challenges experienced in the related art include complex technical, operation, financial, and revenue management relating to a vast grid, even in a symbiotic relationship with the microgrids. Other challenges for utility entities include steadily increasing load patterns, aging grid infrastructure, economic impact of load loss, and social impact of load loss, increasing demand for reliable and affordable power, the technological advancements causing price decline of energy storage devices, the advent of renewable energy technologies, and the threat of climate change imposed by fossil-fuel energy sources. Currently, microgrids remain unattractive as an investment for utility entities as the payback period is lengthy, the return-on investment (ROI) is poor, and wide adoption depends on better market incentives.

In addition, calculating optimal peak shave limit is a challenge in the related art as optimal peak shave limit is usually defined for a month while an energy charge is spread across all days of a week. Taking into consideration various factors, such as the grid services, multiple DER sources, varying loads. and PV cells, the scheduling problem in an effort to optimize peak shaving, energy arbitrage, and grid services is a challenge in the related art. Currently, optimizing peak shaving, energy arbitrage, and grid services requires in inordinately large computing infrastructure that is often associated with a complex architecture of controllers. Without an optimal dispatch solution in the related art, the microgrid owner is at the risk of underutilization of the resources, thereby losing cost-saving opportunities and further losing revenue opportunities. Therefore, a need exists in the related art for a technology that automatically manages and optimizes microgrids in relation to DERs.

SUMMARY

In addressing at least the challenges experienced in the related art, the systems, apparatuses, devices, and methods of the present disclosure involve a deterministic multi-stage optimal dispatch engine system for use with DERMs handling grid-connected microgrids. The deterministic multi-stage optimal dispatch engine system is operable via hardware-agnostic intelligent control algorithms that are based on at least one of advanced control theory and optimization theory; and the deterministic multi-stage optimal dispatch engine is configured to dispatch and control a plurality of DERs, e.g., comprising, or coupled with, a plurality of microgrids, over a plurality of implementations. By example only, an engine system for dispatching and controlling a plurality of DERs comprises a server, a controller, and a processor, the processor operable via hardware-agnostic intelligent control algorithms to operate at least one of the server and the controller.

In accordance with an embodiment of the present disclosure, an engine system, for dispatching and controlling a plurality of distributed energy resources (DERs) comprising a plurality of microgrids, comprises: a server; a controller configured to operably couple with the server and the plurality of DERs; and at least one processor configured to operably couple with the server and the controller, the at least one processor configured to operate the server and the controller in an online mode and an offline mode, the at least one processor further configured, when operating in the offline mode, to: operate the server to perform a first stage optimization by applying a first stage objective function with a first set of constraints to a first set of parameters approximately one month in advance of a given date and time, thereby determining a first stage optimal peak shaving limit; and operate the server to perform a second optimization by applying a second stage objective function with a second set of constraints to a second set of parameters and the first optimal peak shaving limit approximately one day in advance of a given date and time, thereby determining a second stage soft constraint and at least one grid service recommendation, and the at least one processor further configured, when operating in the online mode, to: operate the server to perform a third stage optimization by applying a third stage objective function with a third set of constraints to a third set of parameters, the first stage optimal peak shaving limit, the second stage soft constraint, and the least one grid service recommendation approximately one hour in advance of a given date and time, thereby determining a third stage soft constraint and at least one optimal dispatch point; and operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point approximately in real-time, thereby determining a final set of set-points, whereby at least one of forecast information and real-time information is providable, operational expense is reducible, and at least one new revenue generation avenue is establishable.

In accordance with an embodiment of the present disclosure, a method of providing an engine system, for dispatching and controlling a plurality of distributed energy resources (DERs) comprising a plurality of microgrids, comprises: providing a server; providing a controller configured to operably couple with the server and the plurality of DERs; and providing at least one processor configured to operably couple with the server and the controller, providing the at least one processor comprising configuring the at least one processor to operate the server and the controller in an online mode and an offline mode, providing the at least one processor further comprising configuring the at least one processor, when operating in the offline mode, to: operate the server to perform a first stage optimization by applying a first stage objective function with a first set of constraints to a first set of parameters approximately one month in advance of a given date and time, thereby determining a first stage optimal peak shaving limit; and operate the server to perform a second optimization by applying a second stage objective function with a second set of constraints to a second set of parameters and the first stage optimal peak shaving limit approximately one day in advance of a given date and time, thereby determining a second stage soft constraint and at least one grid service recommendation, and providing the at least one processor further comprising configuring the at least one processor, when operating in the online mode, to: operate the server to perform a third stage optimization by applying a third stage objective function with a third set of constraints to a third set of parameters, the first stage optimal peak shaving limit, the second stage soft constraint, and the least one grid service recommendation approximately one hour in advance of a given date and time, thereby determining a third stage soft constraint and at least one optimal dispatch point; and operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point approximately in real-time, thereby determining a final set of set-points, whereby at least one of forecast information and real-time information is providable, operational expense is reducible, and at least one new revenue generation avenue is establishable.

In accordance with an embodiment of the present disclosure, a method of dispatching and controlling a plurality of distributed energy resources (DERs) comprising a plurality of microgrids, by way of an engine system, comprises: providing the engine system, providing the engine system comprising: providing a server; providing a controller configured to operably couple with the server and the plurality of DERs; and providing at least one processor configured to operably couple with the server and the controller, providing the at least one processor comprising configuring the at least one processor to operate the server and the controller in an online mode and an offline mode, providing the at least one processor further comprising configuring the at least one processor, when operating in the offline mode, to: operate the server to perform a first stage optimization by applying a first stage objective function with a first set of constraints to a first set of parameters approximately one month in advance of a given date and time, thereby determining a first stage optimal peak shaving limit; and operate the server to perform a second optimization by applying a second stage objective function with a second set of constraints to a second set of parameters and the first stage optimal peak shaving limit approximately one day in advance of a given date and time, thereby determining a second stage soft constraint and at least one grid service recommendation, and providing the at least one processor further comprising configuring the at least one processor, when operating in the online mode, to: operate the server to perform a third stage optimization by applying a third stage objective function with a third set of constraints to a third set of parameters, the first stage optimal peak shaving limit, the second stage soft constraint, and the least one grid service recommendation approximately one hour in advance of a given date and time, thereby determining a third stage soft constraint and at least one optimal dispatch point; and operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point approximately in real-time, thereby determining a final set of set-points, whereby at least one of forecast information and real-time information is providable, operational expense is reducible, and at least one new revenue generation avenue is establishable.

Some of the features in the present disclosure are broadly outlined in order that the section entitled Detailed Description is better understood and that the present contribution to the art is better appreciated. Additional features of the present disclosure are hereinafter described. In this respect, the present disclosure is not limited in its implementation to the details of the components or steps, as herein set forth or as illustrated in the several figures of the Drawings, which may be carried out in various ways that are also encompassed by the present disclosure. The phraseology and terminology herein employed are for the purpose of the description and should not be regarded as limiting.

BRIEF DESCRIPTION OF THE DRAWINGS(S)

The above, and other, aspects, features, and advantages of several embodiments of the present disclosure will be more apparent from the following Detailed Description as presented in conjunction with the following several figures of the Drawings.

Figure 7A:
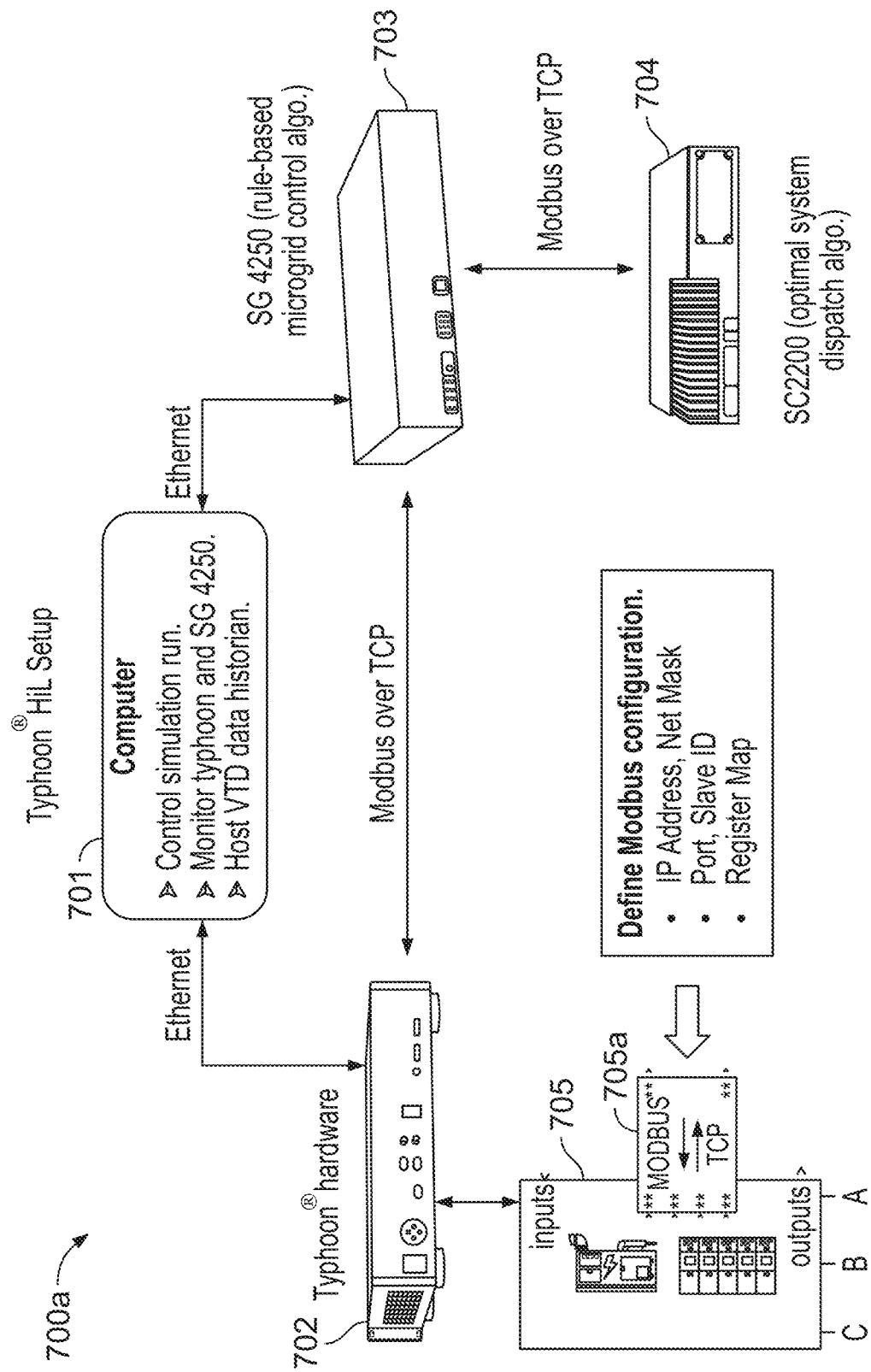
FIG. 7A is a schematic diagram illustrating a hardware-in-the-loop (HiL) setup for performing a test and validation, in accordance with an embodiment of the present disclosure.
Figure 7B:
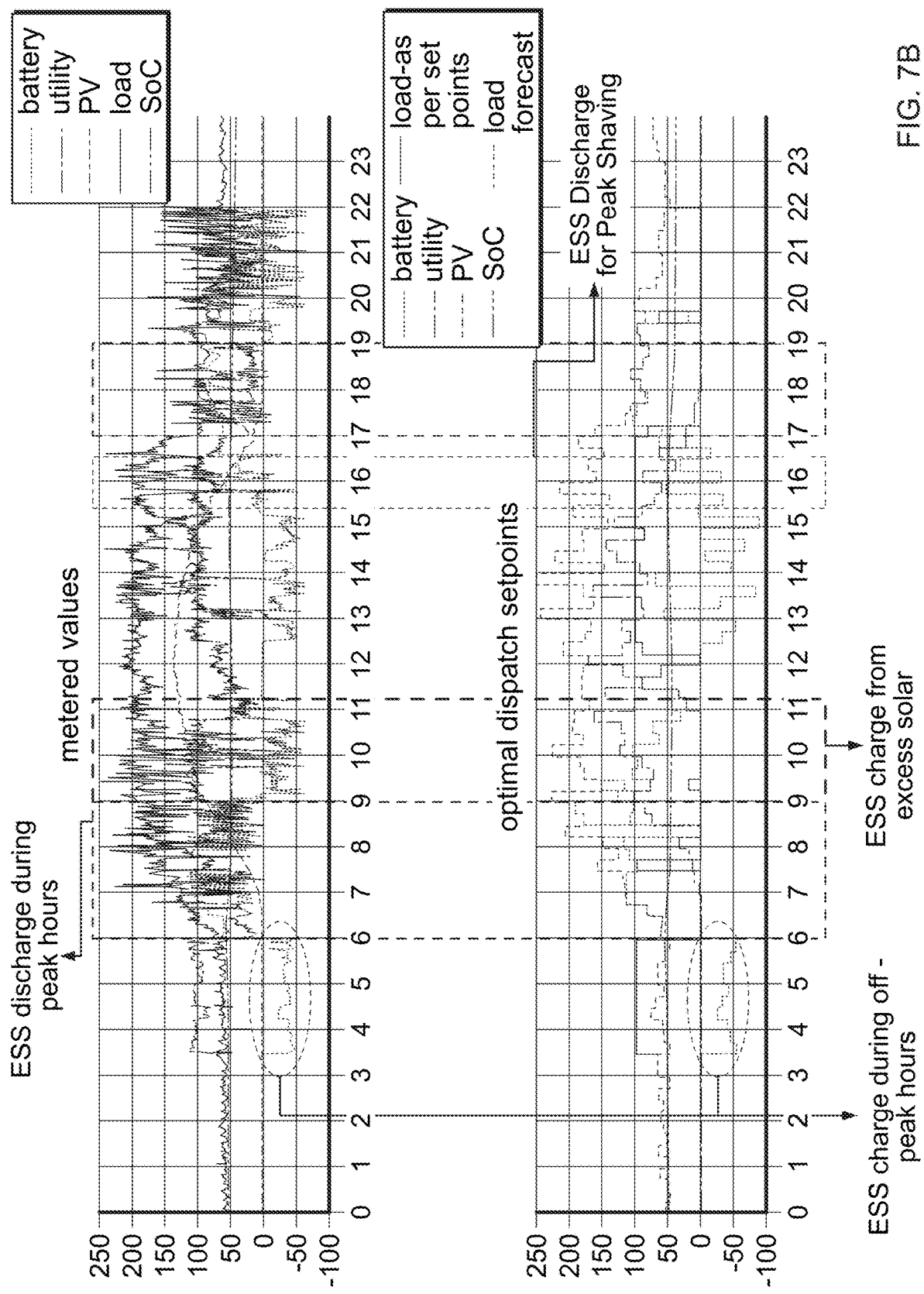

FIG. 7B is a graph illustrating comparative data of energy storage system (ESS) discharge during peak hours, ESS charge during off-peak hours, ESS charge from excess solar energy, and ESS charge for peak shaving for metered values as a function of an hour of a day and ESS discharge during peak hours, ESS charge during off-peak hours, ESS charge from excess solar energy, and ESS charge for peak shaving for optimally dispatched set-points as a function of hour of a day, wherein the lower graph portion corresponds to optimally dispatched set-points as dispatched to the DERs, by using the first test and validation process, as shown in FIG. 7A, in accordance with an embodiment of the present disclosure.

Figure 8A:
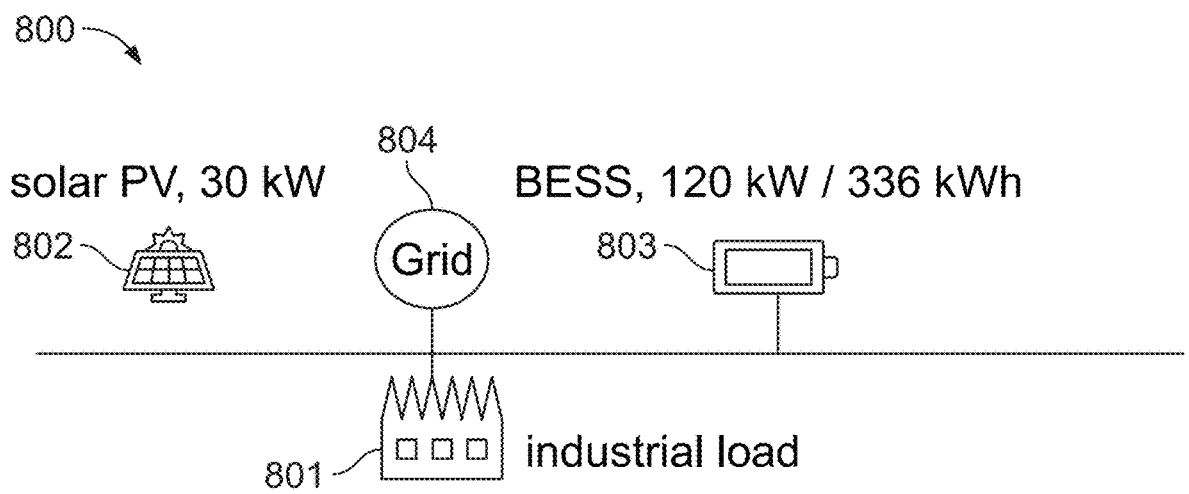

FIG. 8A is a schematic diagram illustrating a solar energy setup for performing a test and validation, in accordance with an embodiment of the present disclosure.

Figure 8B:
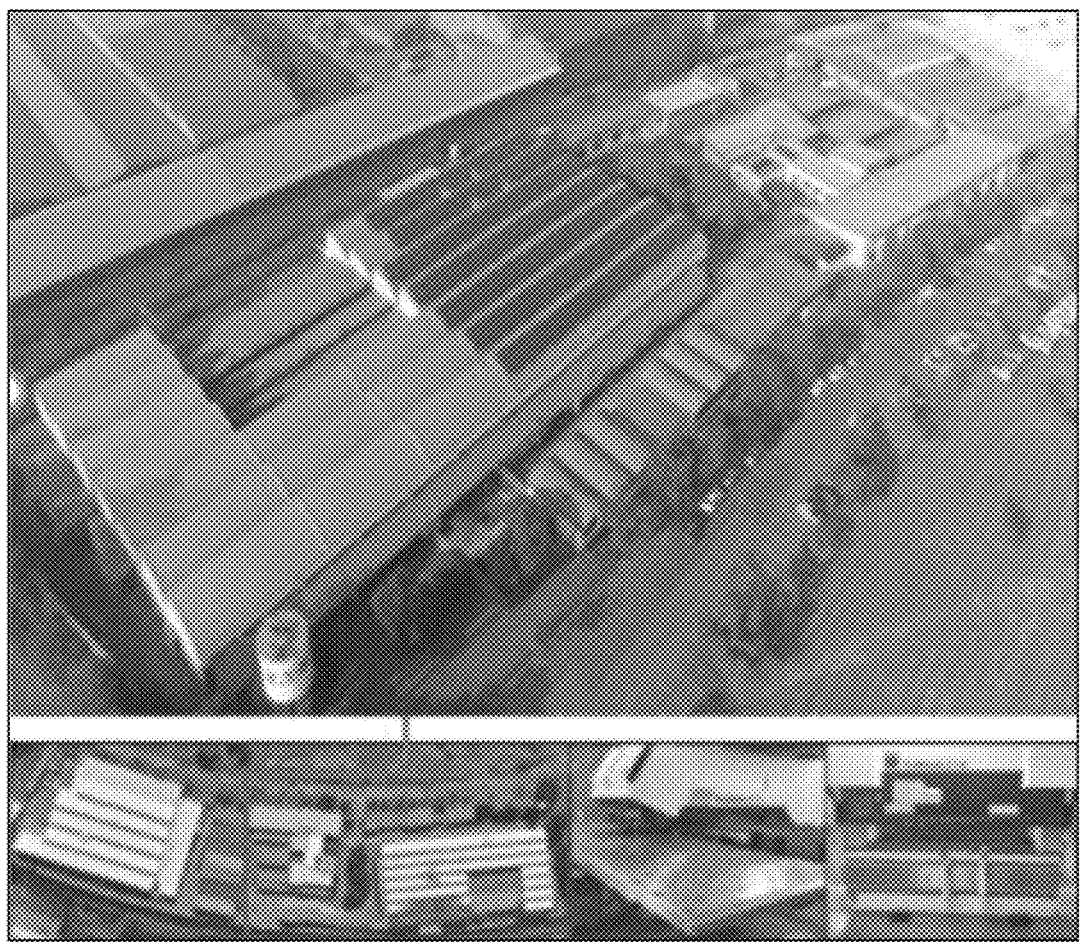

FIG. 8B is a set of photographs illustrating an industrial facility using an industrial load component configured to power by a grid, a PV grid, and a battery storage system (BESS), as shown in FIG. 8A, in accordance with an embodiment of the present disclosure.

Figure 8C:
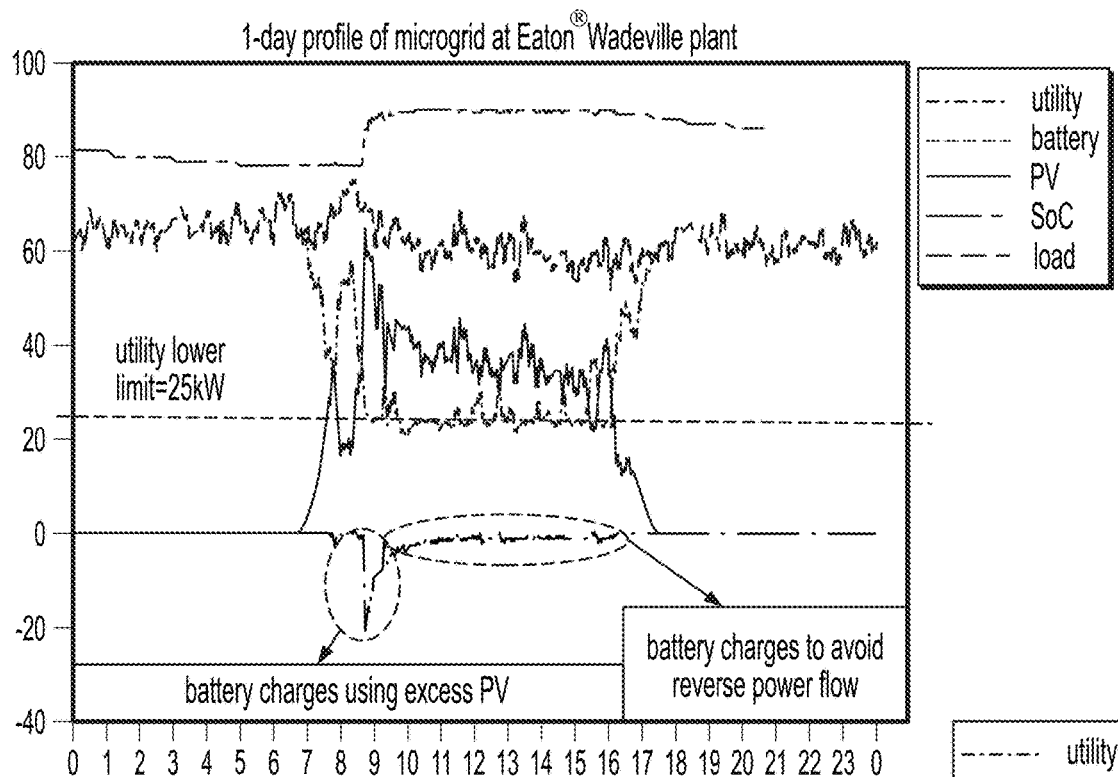

FIG. 8C is a graph illustrating a weekend power profile resulting from the solar energy setup having performed the test and validation, as shown in FIGS. 8A and 8B, in accordance with an embodiment of the present disclosure.

Figure 8D:
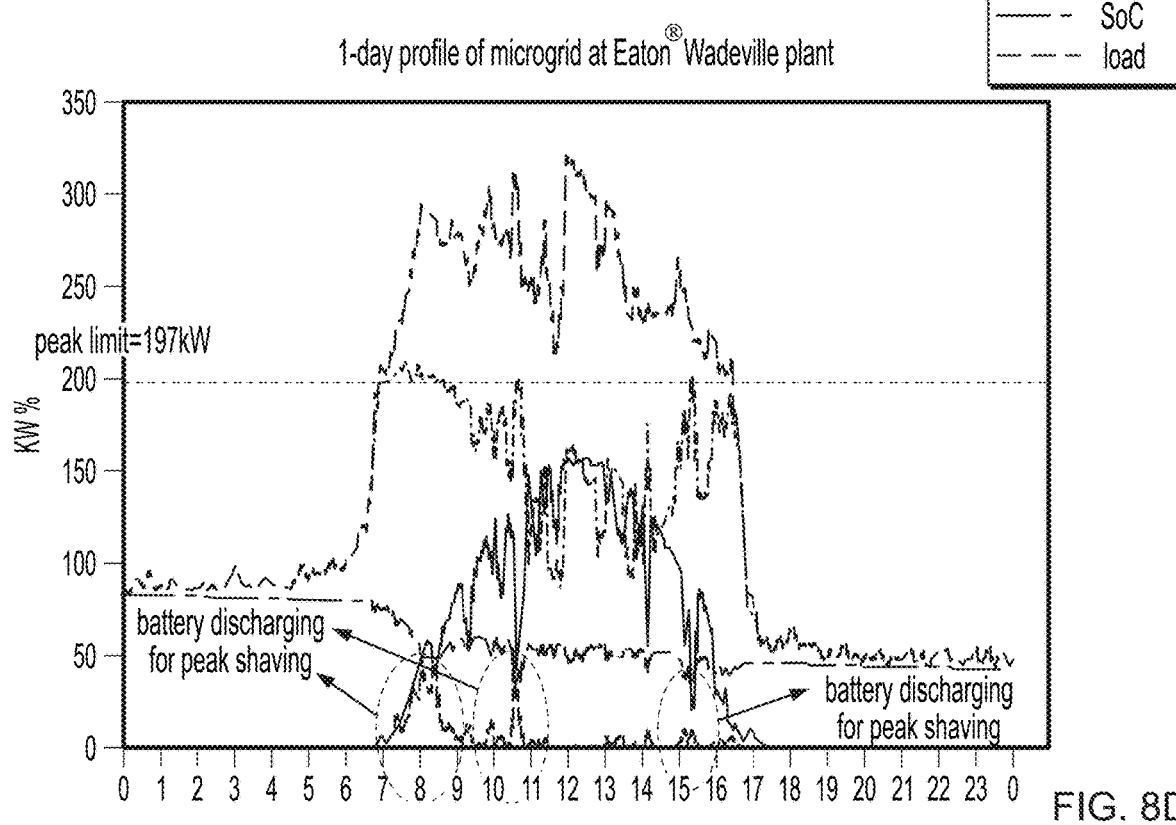

FIG. 8D is a graph illustrating another weekend power profile resulting from the solar energy setup having performed the test and validation, as shown in FIGS. 8A and 8B, in accordance with an embodiment of the present disclosure.

Figure 9:
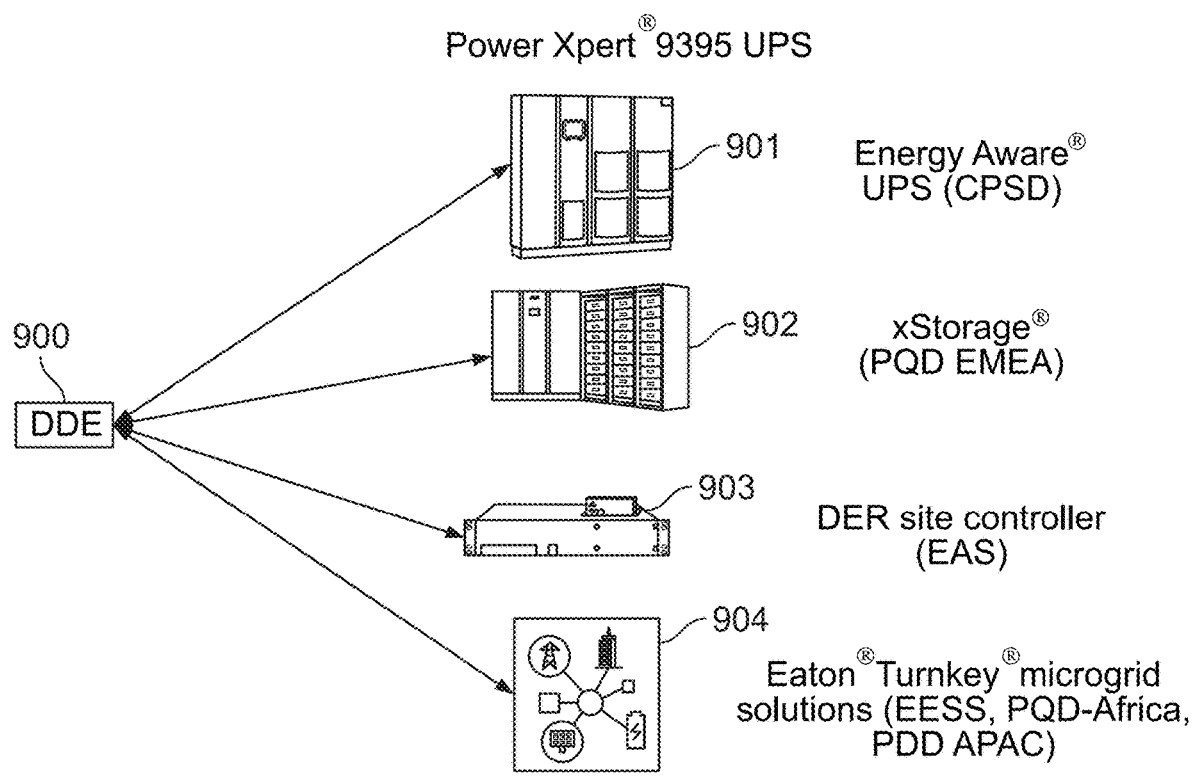

FIG. 9 is a schematic diagram illustrating an implementation of an engine system for dispatching and controlling a plurality of DERs operable with various EATON® products, in accordance with an embodiment of the present disclosure.

Figure 10:
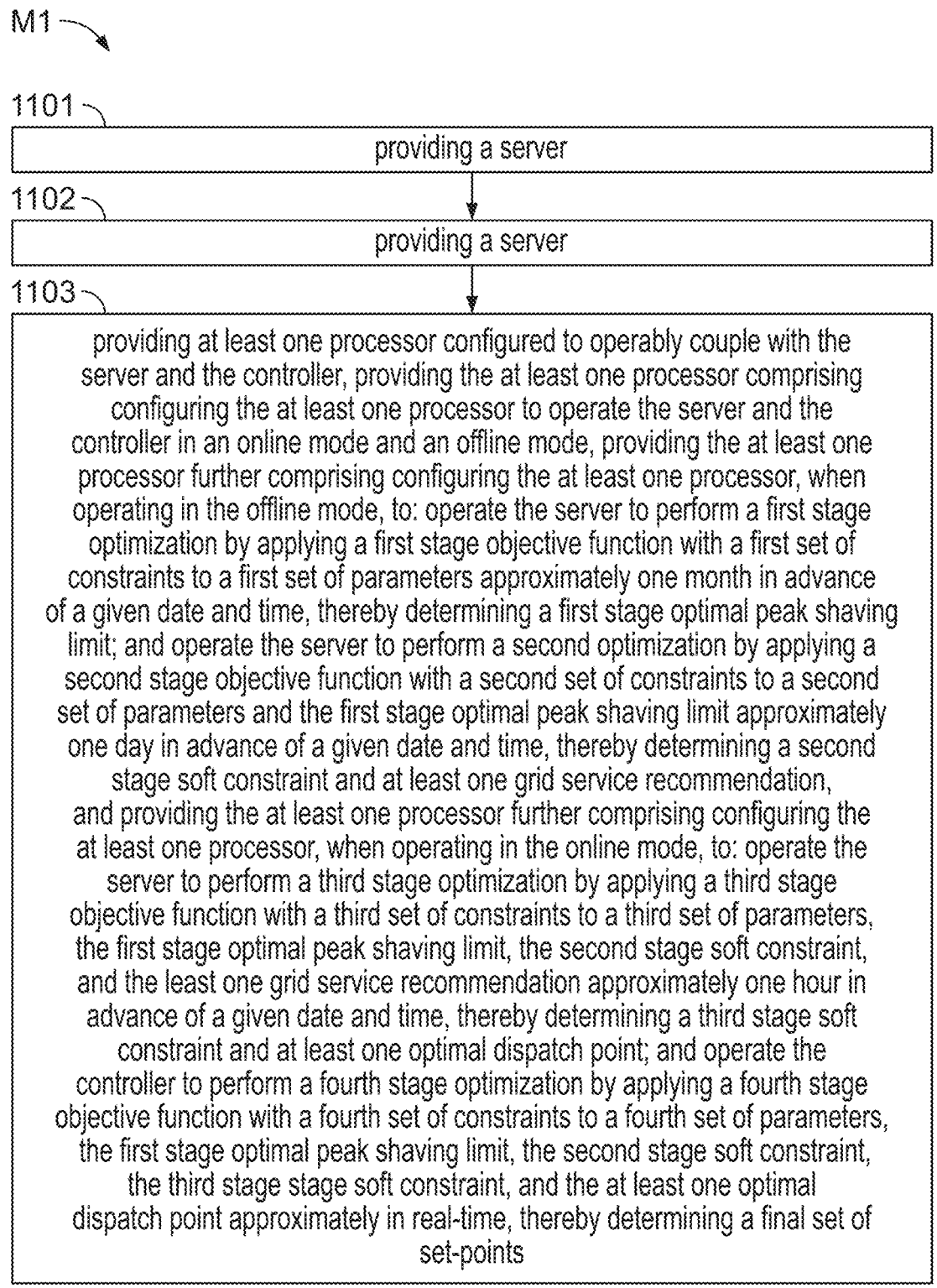

FIG. 10 is a flow diagram illustrating a method of providing an engine system for dispatching and controlling a plurality of DERs comprising a plurality of microgrids, in accordance with an embodiment of the present disclosure.

Figure 11:
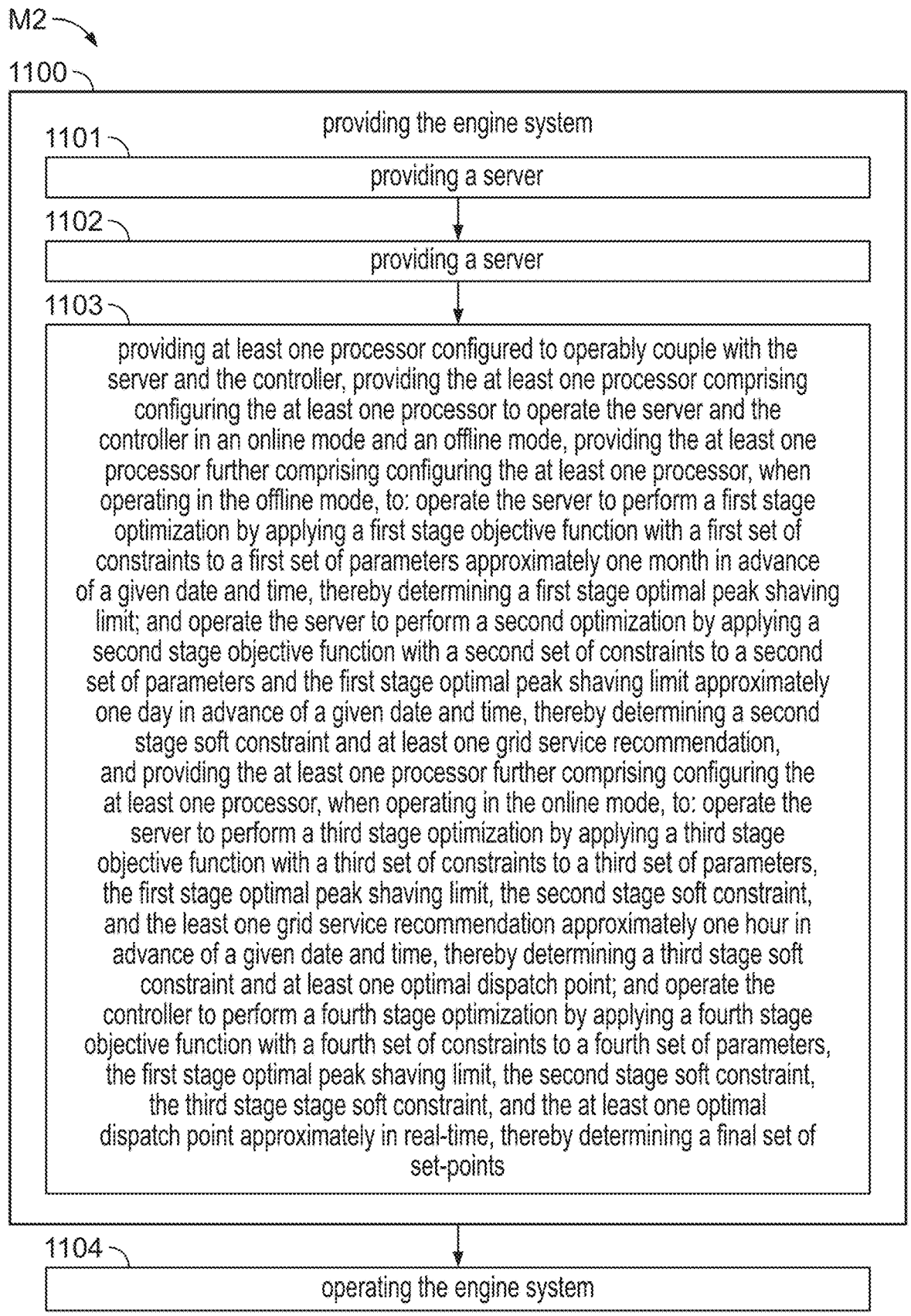

FIG. 11 is a flow diagram illustrating a method of dispatching and controlling a plurality of DERs comprising a plurality of microgrids by way of an engine system, in accordance with an embodiment of the present disclosure.

Corresponding reference numerals or characters indicate corresponding components throughout the several figures of the Drawings. Elements in the several figures of the Drawings are illustrated for simplicity and clarity and have not necessarily been drawn to scale. For example, the dimensions of some elements in the several figures may be emphasized relative to other elements for facilitating understanding of the various presently disclosed embodiments. Also, common, but well-understood, elements that are useful or necessary in commercially feasible embodiment are often not depicted to facilitate a less obstructed view of these various embodiments of the present disclosure.

DETAILED DESCRIPTION

Various embodiments and aspects of the present disclosure will be described with reference to the below details. The following description and Drawings are illustrative of the present disclosure and are not to be construed as limiting the disclosure. Numerous specific details are described to provide a thorough understanding of various embodiments of the present disclosure. However, in certain instances, well-known or conventional details are not described to provide a concise discussion of the embodiments of the present disclosure.

As used herein, the terms "comprises" and "comprising" are to be construed as being inclusive and open ended, and not exclusive. Specifically, when used in the specification and the claims, the terms "comprises," and "comprising," and variations thereof denote the specified features, steps, or components are included. These terms are not to be interpreted to exclude the presence of other features, steps, or components.

As used herein, the terms "sample," "example," or "exemplary" denote "serving as an example, instance, or illustration," and should not be construed as preferred or advantageous over other configurations disclosed herein.

As used herein, the terms "about" and "approximately" denote variations that may exist in the upper and lower limits of the value ranges, such as variations in properties, parameters, and dimensions. In one non-limiting example, the terms "about" and "approximately" denote plus or minus approximately 10 percent or less.

Various nomenclature is used herein to describe the hardware-agnostic intelligent control algorithms by which the systems apparatuses, devices, and methods of the present disclosure are operable. Some example nomenclature for sets and indices, as used by the hardware-agnostic intelligent control algorithms, is as follows: G denotes a set of all diesel generators (DG) connected to the microgrid; S denotes a set of all storage devices connected to the microgrid; PV denotes a set of all solar PV sources connected to the microgrid; (n) denotes a group of generators connected to a node n; and N denotes a set of nodes.

Some example nomenclature for parameters, as used by the hardware-agnostic intelligent control algorithms, is as follows: Cg denotes an operating cost for a generator g; Cgrid denotes a cost of utility power; Dgrid denotes a demand charge of a utility power; δT denotes a time step; $\eta_d$ denotes a storage device discharging efficiency; $\eta_c$ denotes a storage device charging efficiency; NLg denotes a no-load cost for a generator g; Pgmin denotes a minimum real power supplied by a generator g; Pgmax denotes a maximum real power supplied by a generator g; Pdmin denotes a minimum real power discharge by a storage device s; Pdmax denotes a maximum real power discharge by a storage device s; Pcmin denotes a minimum real power charge by a storage device s; Pcmax denotes a maximum real power charge by a storage device s; Rg+ denotes a ramp-up rate for a generator g; Rg− denotes a ramp-down rate for generator g; Rs+ denotes a ramp-up rate for a storage device s; Rs− denotes a ramp-down rate for a storage device s; Qmin denotes a minimum state of charge of a storage device s; Qmax denotes a maximum state of charge of a storage device s; RgSU denotes a startup ramp rate for a generator g; RgSD denotes a shut-down ramp rate for a generator g; SUg denotes a startup cost for a generator g; SDg denotes a shutdown cost for a generator g; $U_{TG}$ denotes a minimum uptime of a generator g; $D_{TG}$ denotes a minimum downtime of a generator g; $load_n$ denotes a real power load at node n; $C_{SD}$ denotes a cost of discharge of a storage device s; and $C_{SC}$ denotes a cost of charge of a storage device s.

Some example nomenclature for variables, as used by the hardware-agnostic intelligent control algorithms, is as follows: Pg denotes a real power supplied by generator g; Pgt denotes a real power supplied by a generator g at time t; $P_d$ denotes a real power discharge from a storage device s; $P_{dt}$ denotes a real power discharge from a storage device s at time t; Pc denotes a real power charge from a storage device s; $P_{ct}$ denotes a real power charge to a storage device s at time t; $Q_s$ denotes a state of charge of storage device s; $Q_{st}$ denotes a state of charge of a storage device s at time t; $P_{pvs}$ denotes a real power supplied by the PV source; $P_{pvst}$ denotes a real power supplied by the PV source pvs at time t; $P_{pva}$ denotes real power available from the PV source; $P_{pvat}$ at denotes a real power available from the PV source at time t; ug denotes a unit commitment variable representing the state of a generator g; binary variable; ugt denotes a unit commitment variable representing the state of a generator g at time t; binary variable; vg denotes a startup variable; vgt denotes a startup variable at time t; wg denotes a shutdown variable; wgt denotes a shutdown variable at a time t; Pgrid denotes a real power from the grid; and Pgridt denotes a real power from the grid at a time t.

Some example nomenclature for an objective function, as used by the hardware-agnostic intelligent control algorithms, is as follows: for performing a first stage optimization, e.g., approximately one month in advance of a given date and time, the expression, $\Sigma_t \Sigma_g$(Cg*Pgt+NLg*ugt+SUg*vgt+SDg*wgt) $\Sigma_t \Sigma_s (C_{SD} * P_{dt}) + \Sigma_t$Pgridt*Cgrid+max (Pgrid)*Dgrid, is minimized; for performing a second stage optimization, e.g., approximately one day in advance of a given date and time, the expression, $\Sigma_t \Sigma_g$(Cg*Pgt+NLg*ugt+SUg*vgt+SDg*wgt)+$\Sigma_t \Sigma_s (C_{SD}*P_{dt})$+$\Sigma_t$Pgridt*Cgrid, is minimized along with peak shaving limit and grid services constraints; for performing a third stage optimization, e.g., approximately at least one hour in advance of a given date and time, the expression, $\Sigma_t \Sigma_g$(Cg*Pgt+NLg*ugt+SUg*vgt+SDg*wgt)+$\Sigma_t \Sigma_s (C_{SD}*P_{dt})$+$\Sigma_t$Pgridt*Cgrid, is minimized along with peak shaving limit and grid services constraints; and for performing a fourth stage optimization, e.g., performing a real-time dispatch, applying a rule-based optimization algorithm, the rule-based optimization algorithm based on at least one of node balance and stability of a distributed energy resource management system (DERMS), wherein t denotes a time interval in a specified prediction horizon.

Some example nomenclature for constraints, as used by the hardware-agnostic intelligent control algorithms, is as follows: for a generator minimum/maximum capacity limit, the constraint is expressed as Pgmin*ugt≤Pgt≤Pgmax*ugt, $\forall$g,t; for a generator unit commitment, the constraint is expressed as $v_{gt} - w_{gt} = u_{gt} - u_{gt-1}$, $\forall$g; for a generator startup, the constraint is expressed as $\Sigma_{s=t-UTg+1}^{t}$ vgs≤ugt,$\forall$g, t∈{UTg, . . . , T}; for a generator shut down, the constraint is expressed as $\Sigma_{s=t-DTg+1}^{t}$ Wgs≤1–ugt, $\forall$g, t∈{DTg, . . . , T}; for a generator ramp-up/ramp-down, the constraints are respectively expressed as $P_{gt}-P_{gt-1}$≤Rg+(ugt–1)+RgSU*vgt,$\forall$g,t and $P_{gt-1}-P_{gt}$≤Rg–(ugt)+RgSD*wgt,$\forall$g,t; for an SoC minimum/maximum limit, the constraint is expressed as Qmin≤Qs,≤Qmax, $\forall$s,t; for PV availability, the constraint is expressed as $P_{pvst}$≤$P_{pvat}$,$\forall$t; for node balance, the constraint is expressed as Pgridt+$\Sigma_g$Pgt+$\Sigma_s P_{dt}$–$\Sigma_s P_{dt}$–$\Sigma_{PV}P_{pvst}$–$\Sigma_n$load$_n$=0; for a storage charge/discharge limits, the constraints are respectively expressed as Pdmin≤Pd,≤Pdmax, $\forall$s,t and Pcmin≤Pc,≤Pcmax, $\forall$s,t; for a storage ramp-up/ramp-down, the constraints are respectively expressed as $P_d-P_{d-1}$≤Rs–, $\forall$s,t and $P_c-P_{c-1}$≤Rs+, $\forall$s,t; for an SoC equation, the constraint is expressed as $Q_s-Q_{s-1}=\eta_c$*Pc,t*$\delta$T–(1/$\eta_d$)*Pd,t*$\delta$T, $\forall$s,t; for a binary generator unit commitment variables, the constraints are respectively expressed as 0≤vgt≤1,$\forall$g,t, 0≤wgt≤1,$\forall$g,t, and ugt∈{0,1}, wherein SoC denoted a state of charge.

In accordance with some embodiments of the present disclosure, a deterministic multi-stage optimal dispatch engine system, operable via the hardware-agnostic intelligent control algorithms, is configured to incent investment in microgrids by achieving significant savings by reducing operational expense (OpEx), e.g., in the form of utility cost savings, and by creating new avenues for revenue generation, thereby reducing the payback period, and thereby incenting widespread adoption of microgrids. Since implementations of microgrids require complex scheduling algorithms being adaptive to a grid system's operating conditions, the deterministic multi-stage optimal dispatch engine system of the present disclosure is robust, scalable, and readily implementable.

In accordance with some embodiments of the present disclosure, an engine system for dispatching and controlling a plurality of DERs over a plurality of implementations, comprises: a controller; and a server operable by way of the controller. The controller comprises at least one of: at least one processor and a programmable logic controller (PLC), in accordance with some embodiments of the present disclosure. The controller is configured to dispatch and control the plurality of DERs over the plurality of implementations by way of the at least one processor operable via a set of executable instructions storable in relation to a non-transient memory device. The set of executable instructions comprising hardware-agnostic intelligent control algorithms. The hardware-agnostic intelligent control algorithms comprise a multi-stage dispatch algorithm, e.g., a four-stage optimal dispatch algorithm, to adequately capture opportunities for achieving energy savings and for generating additional revenue by participating in grid services. Depending on the stage of optimization and the specific purpose that each stage serves in an overall objective, the algorithms of the present disclosure are selected to run either in one of an online mode and an offline mode, thereby intelligently managing the computational requirements and solution time of a DERMS.

In accordance with some embodiments of the present disclosure, a method of dispatching and controlling a plurality of DERs over a plurality of implementations by way of a deterministic multi-stage optimal dispatch engine system, operable via the hardware-agnostic intelligent control algorithms. The method of dispatching and controlling the plurality of DERs involves a multi-stage dispatch algorithm, e.g., a four-stage optimal dispatch algorithm, to adequately capture opportunities for achieving energy savings and for generating additional revenue by participating in grid services. Depending on the stage of optimization and the specific purpose that each stage serves in an overall objective, the algorithms of the present disclosure are selected to run either in one of an online mode and an offline mode, thereby intelligently managing the computational requirements and solution time of a DERMS.

In accordance with some embodiments of the present disclosure, the hardware-agnostic intelligent control algorithms comprise a multi-stage optimal dispatch algorithm, the multi-stage optimal dispatch algorithm comprising an offline algorithm and an online algorithm. Depending on the stage of optimization and the specific purpose which each stage serves in an overall objective, an algorithm of the hardware-agnostic intelligent control algorithms is selected to run in one of an online mode and an offline mode, thereby intelligently managing the computational requirements and solution time in relation to the plurality of DERs over a plurality of implementations.

In accordance with some embodiments of the present disclosure, the offline algorithm comprises: performing a first stage optimization, performing the first stage optimization comprising optimizing power allocation approximately one month in advance of a given date and time, thereby determining a peak shave limit; and performing a first second optimization, performing the second stage optimization comprising optimizing power allocation approximately one day in advance of a given date and time, thereby determining a grid service requirement. For example, performing the first stage optimization comprises optimizing power allocation based on at least one factor of: an installed capacity of a DER, a ramp-rate capability of a DER, a utility tariff structure in a given geographic location, an availability status of a DER, a utility agreement provision limiting maximum drawable power, if any, a load forecast, and a PV forecast for a given facility, thereby deriving an optimal dispatch schedule for a next time period or an "advance time," e.g., a next month, and thereby intelligently determining at least one of: at least one charge/discharge schedule for an ESS, at least one controllable load, if any, and thereby providing at least one optimal peak shaving limit, e.g., the first optimal peak shaving limit, the second optimal peak shaving limit, and the third optimal peak shaving limit.

In accordance with some embodiments of the present disclosure, the online algorithm comprises: performing a third stage optimization, performing the third stage optimization comprising optimizing power allocation approximately at least one hour in advance of a given date and time, thereby determining a dispatch point for a next time stamp; and performing a fourth stage optimization, performing the fourth stage optimization comprising optimizing power allocation approximately in real-time, thereby determining a dispatch point for each second in time, e.g., second granularity. Computationally light, robust, and scalable, the multi-stage optimal dispatch algorithm provides both long-term optimization and short-term forecasting. The algorithm optimally blends the OpEx reduction and revenue generation to yield maximum benefits.

Figure 1:
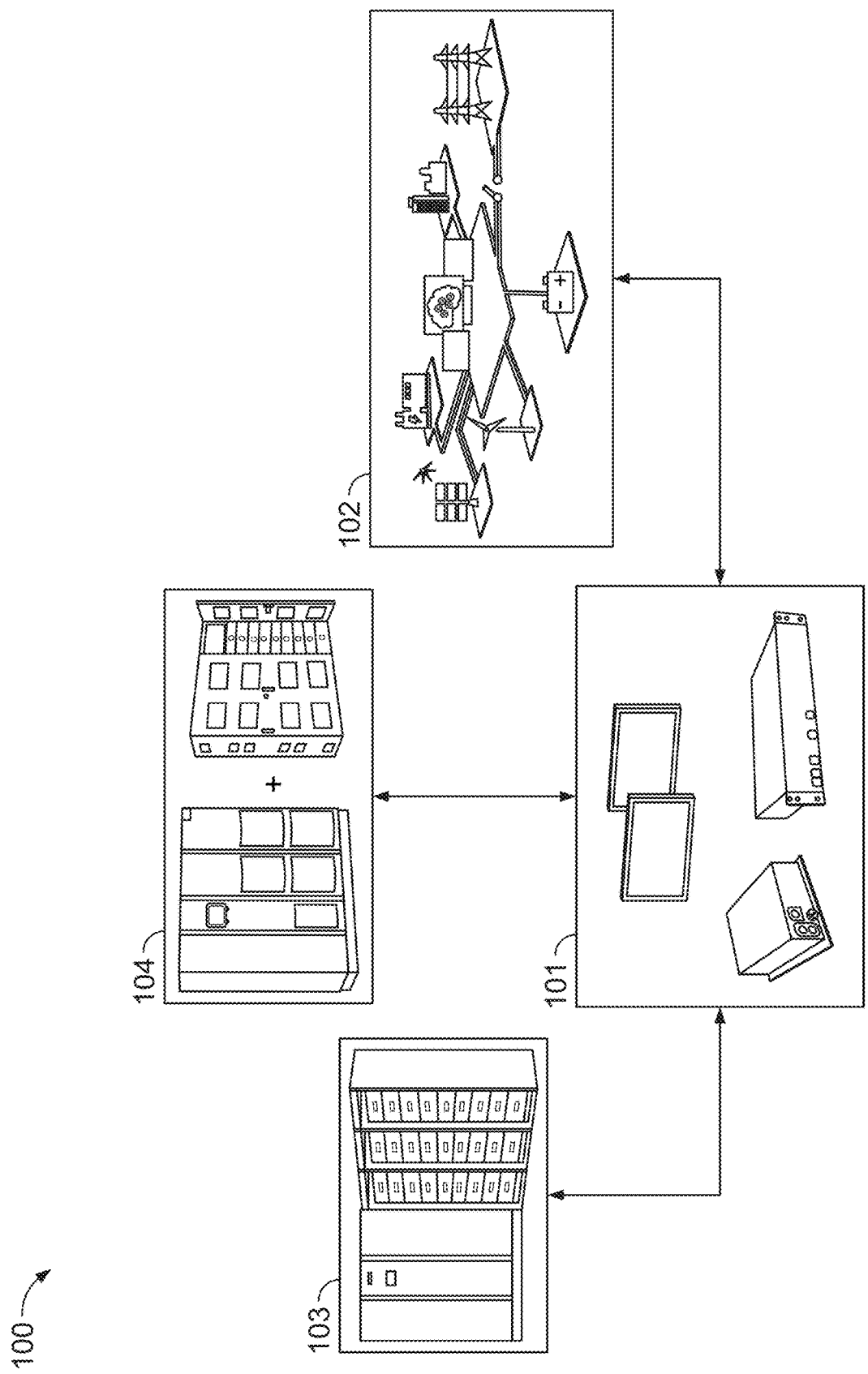
FIG. 1 is a schematic diagram illustrating a macrogrid environment in which an engine system for dispatching and controlling a plurality of DERs is implementable, in accordance with an embodiment of the present disclosure.
Figure 3:
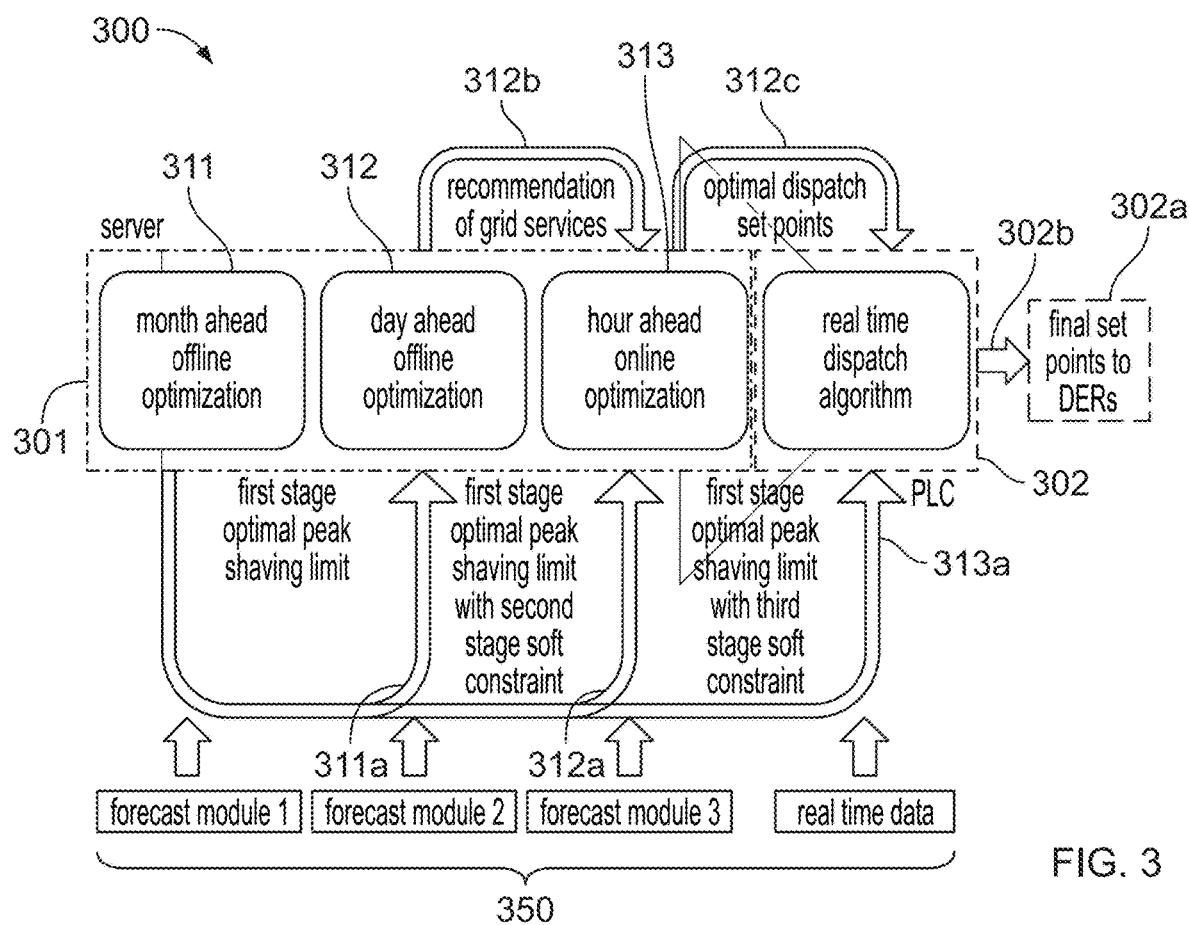
FIG. 3 is a schematic diagram illustrating illustrates a workflow of an engine system for dispatching and controlling the plurality of DERs, in accordance with an embodiment of the present disclosure.

Referring to FIG. 1 and referring ahead to FIG. 3, this schematic diagram illustrates a macrogrid environment 100 in which an engine system 101 or the engine system 350, e.g., comprising a hardware platform 101, for dispatching and controlling a plurality of DERs, is implementable, in accordance with an embodiment of the present disclosure. By example only, the macrogrid environment 100 involves the engine system 101, e.g., further comprising the hardware platform, in communication with a microgrid 102, e.g., an EATON® TURNKEY® microgrid, at least one storage device 103, e.g., an EATON® XSTORAGE® device, and an uninterrupted power supply (UPS) 104, e.g., an EATON® ENERGYAWARE® UPS, wherein the engine system 101 is operable via the hardware-agnostic intelligent control algorithms.

Figure 2:
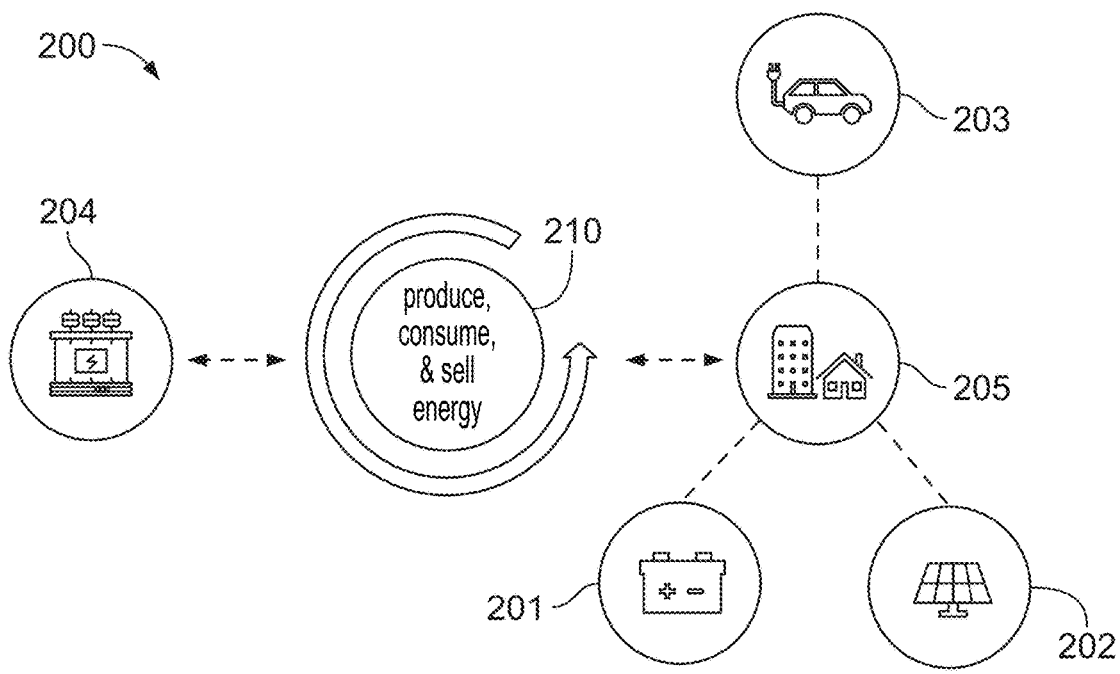
FIG. 2 is a schematic diagram illustrating a DER environment in which an engine system for dispatching and controlling a plurality of DERs is implementable, in accordance with an embodiment of the present disclosure.

Referring to FIG. 2, this schematic diagram illustrates a DER environment 200 in which an engine system 210 for dispatching and controlling a plurality of DERs is implementable, in accordance with an embodiment of the present disclosure. By example only, the DER environment 200 involves an engine system 210 for dispatching and controlling a plurality of DERs, such as a distributed storage device 201, a PV device 202, an EV charging station 203, in relation to a macrogrid distribution center, such as a distribution center 204. The engine system 210 is configured to manage at least one of production, consumption, and sales or energy by dispatching and controlling the plurality of DERs. For example, the plurality of DERs are disposed in relation to an edifice 205, such as a residential edifice and a commercial edifice.

Referring to FIG. 3, this schematic diagram illustrates a workflow 300 of the engine system 350 for dispatching and controlling the plurality of DERs (not shown), in accordance with an embodiment of the present disclosure. For example, the engine system comprises a server 301 and controller 302, e.g., a programmable logic controller (PLC), operably coupled with the server 301 and the plurality of DERs. The server 301 comprises a processor (not shown) operable via the hardware-agnostic intelligent control algorithms and via a first forecast module 311 for performing a first stage optimization, a second forecast module 312 for performing a second stage optimization, and a third forecast module 313 for performing a third stage optimization. By example only, the controller 302 comprises a processor (not shown) operable via the hardware-agnostic intelligent control algorithms. The server 301 is configured to receive data from the plurality of DERs, e.g., data relating to at least one of power consumption and power generation via at least one of wired, wireless, and web-based communication, and to process, e.g., via its processor, the data from the plurality of DERs. By example only, the controller 302 is configured to transmit data 302a relating to a final set of set-points to the plurality of DERs, as indicated by arrow 302b, wherein the data 302a is optimized following the first stage optimization, the second stage optimization, the third stage optimization, and the fourth stage optimization, wherein the fourth stage optimization comprises using a real-time dispatch algorithm. The server 301 is configured, by way of the processor, to perform the first three stages of the multi-stage optimal dispatch algorithm. Alternatively, at least one processor is configured to operate at least one of the server 301 and the controller 302 and may be disposed anywhere in relation to the engine system 300, e.g., not necessarily disposed in the server 301 or in the controller 302.

Still referring to FIG. 3, the server 301, via the first forecast module 311, performs the first stage optimization by calculating a first stage optimal peak shaving limit, wherein data relating to the first stage optimal peak shaving limit is transmitted to the second forecast module 312, as indicated by arrow 311a. The server 301, via the second forecast module 312, performs the second stage optimization by calculating a second stage soft constraint based on the first stage optimal peak shaving limit, wherein data relating to the second stage soft constraint is transmitted to the second forecast module 312, as indicated by arrow 312a. The server 301, via the third forecast module 312, performs the third stage optimization by calculating a third stage soft constraint based on the first stage optimal peak shaving limit and the second stage soft constraint, wherein data relating to the third stage soft constraint is transmitted to the third forecast module 313, as indicated by arrow 313a. The server 301, via the second forecast module 312, transmits data relating to a recommendation of grid services to the third forecast module 313, as indicated by arrow 312b. The server 301, third forecast module 313, transmits data relating to optimal dispatch set-points to the controller 302, as indicated by arrow 312c. The controller 302, via its processor, performs a fourth stage optimization using a real-time dispatch algorithm and transmits the final set of set-points 302a to the plurality of DERs. By example only, the first optimal peak shaving limit is determined or calculated through the first stage optimization, e.g., by executing an optimal dispatch algorithm one month in advance, wherein subsequent stages, the first optimal peak shaving limits is enforced as a soft constraint, e.g., by executing the optimal dispatch algorithm a day in advance, and hour in advance, and so forth. For example, the time at which the optimal dispatch algorithm is executable comprises any desired "advance time," such as in a range of 1 hour to approximately 24 hours to approximately, e.g., in approximately 1-house increments. Only in the first stage optimization is an optimal peak shaving limit, e.g., the first stage optimal peak shaving limit, calculated.

The second and subsequent optimization stages receive data comprising the first stage optimal peak shaving limit from the first stage optimization. In subsequent optimization stages, the data comprising the first stage optimal peak shaving limit is at least one of modelled as, and transformed into, a soft constraint. For example, if the first stage optimal peak shaving limit becomes infeasible for a subsequent optimization stage, the first stage optimal peak shaving limit is modified in a subsequent optimization stage. Conversely, if the first stage optimal peak shaving limit remains feasible for a subsequent optimization stage, the first stage optimal peak shaving limit is retained for all stages. For example, once the first stage optimal peak shaving limit, e.g., for a month in advance, changes due to predicted conditions determined at a day in advance or an hour in advance, a higher value of the first stage optimal peak shaving limit or a modified optimal peak shaving limit is maintained for a remainder of the month.

Figure 4:
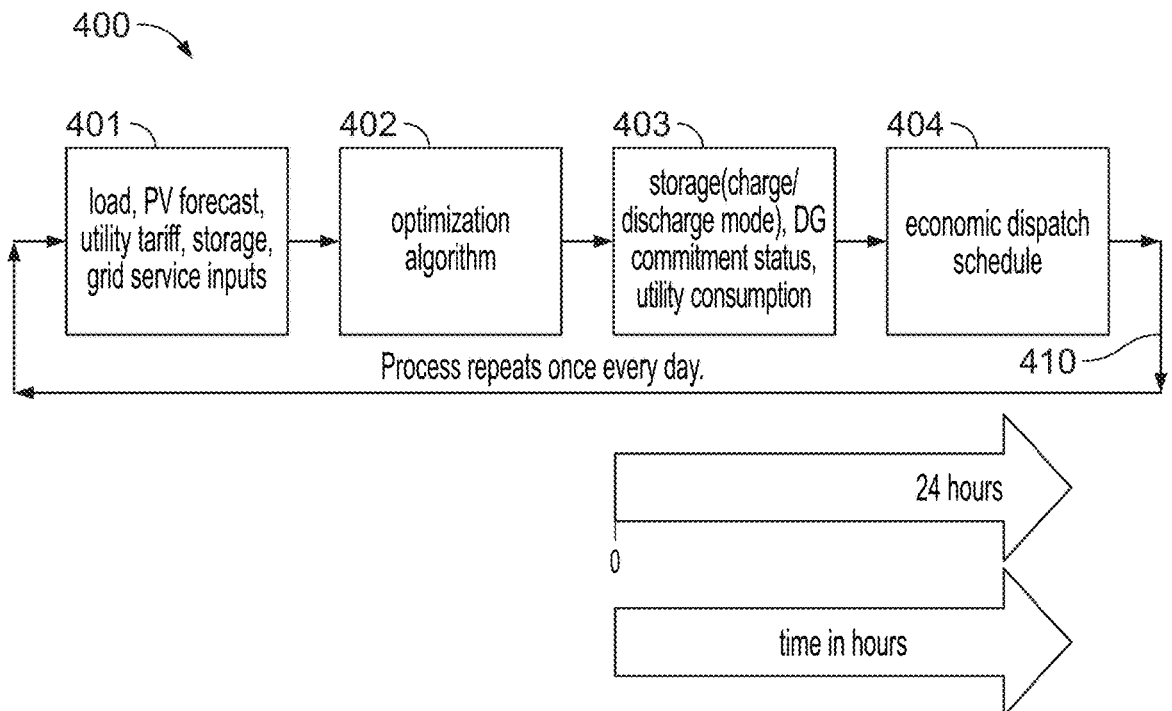
FIG. 4 is a flow diagram illustrating a method of performing a second stage optimization by way of the second forecast module, as shown in FIG. 3, in accordance with an embodiment of the present disclosure.

Referring to FIG. 4, this flow diagram illustrates a method 400 of performing a second stage optimization by way of the second forecast module 312, as shown in FIG. 3, in accordance with an embodiment of the present disclosure. The method 400 comprises iteratively calculating a first optimal peak shaving limit approximately once per day, as indicated by arrow 410. Iteratively calculating a second optimal peak shaving limit comprises determining data relating to at least one of a power load, a PV forecast, a utility tariff, a storage device, e.g., a battery energy storage device, a storage capacity, such as a storage capacity of a storage device and a battery inverter, e.g., in units of kWh or MWh, and a grid service input, as indicated by block 401; applying an optimization algorithm to the data relating to at least one of the power load, the PV forecast, the utility tariff, the storage device, and the grid service input, as indicated by block 402; determining at least one of storage mode, e.g., charge/discharge mode, DG commitment status, utility consumption, as indicated by block 403; and determining an economically optimized dispatch schedule, as indicated by block 404. The prediction horizon comprises approximately 24 hours. Each optimization run will fix the unit commitment and dispatch solution for every hour for the next entire day. The first stage optimization uses a month ahead forecast to calculate optimal peak shave limit. The second stage optimization (the day ahead optimization), a dispatch is optimized subject to the peak shave limit calculated at the first stage optimization.

Figure 5:
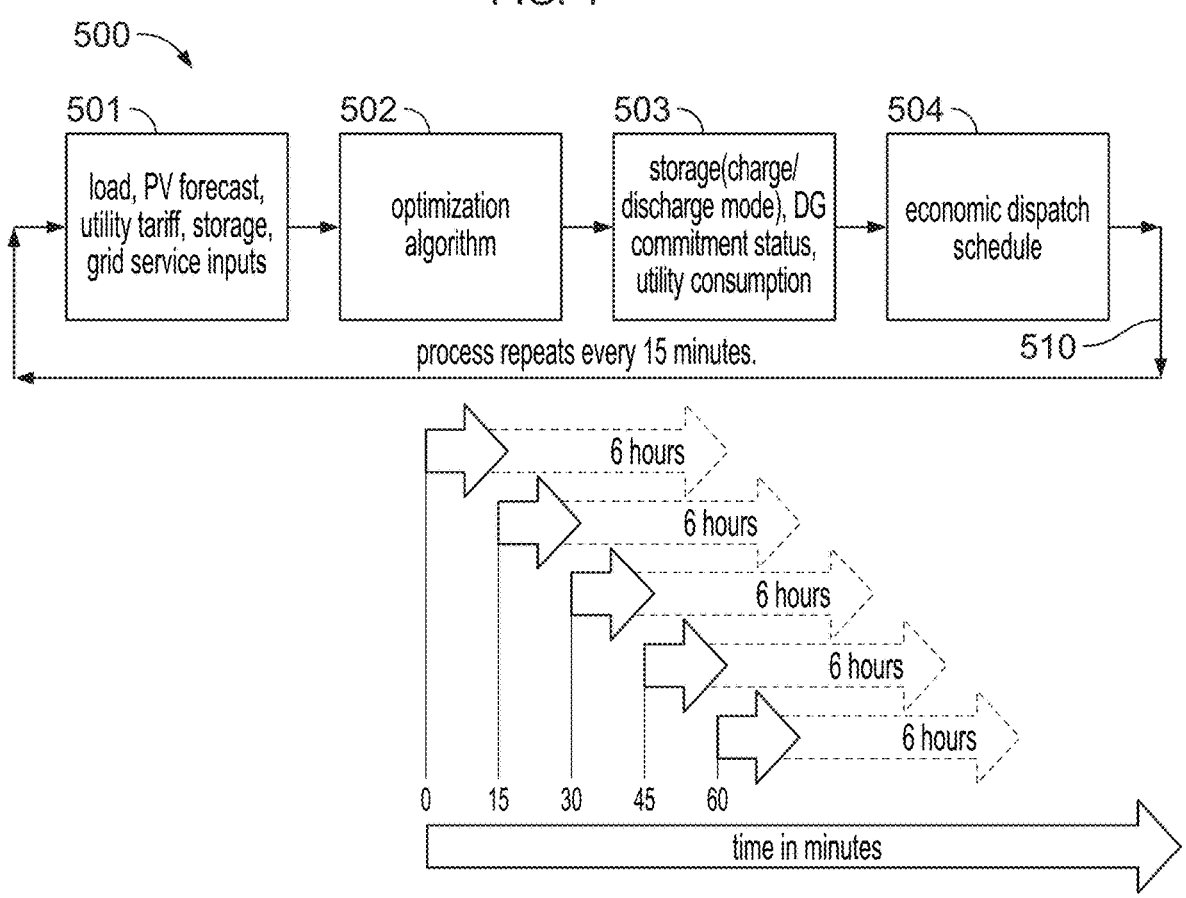
FIG. 5 is a flow diagram illustrating a method of performing a third stage optimization by way of the third forecast module, as shown in FIG. 3, in accordance with an embodiment of the present disclosure.

Referring to FIG. 5, this flow diagram illustrates a method 500 of performing a third stage optimization by way of the third forecast module 313, as shown in FIG. 3, in accordance with an embodiment of the present disclosure. The method 500 comprises iteratively calculating a third optimal peak shaving limit approximately every 15 minutes, as indicated by arrow 510. Iteratively calculating a third optimal peak shaving limit comprises determining data relating to at least one of a power load, a PV forecast, a utility tariff, a storage device, e.g., a battery energy storage device, a storage capacity, such as a storage capacity of a storage device and a battery inverter, e.g., in units of kWh or MWh, and a grid service input, as indicated by block 501; applying an optimization algorithm to the data relating to at least one of the power load, the PV forecast, the utility tariff, the storage device, and the grid service input, as indicated by block 502; determining at least one of storage mode, e.g., charge/discharge mode, DG commitment status, utility consumption, as indicated by block 503; and determining an economically optimized dispatch schedule, as indicated by block 504. The prediction horizon comprises approximately 6 hours (flexible). Each optimization run will fix the dispatch solution for the initial 15 minute period (flexible). The first stage optimization uses a month ahead forecast to calculate optimal peak shave limit. In the third stage optimization (hour ahead optimization) the dispatch is optimized subject to the peak shave limit calculated at the first stage optimization.

Figure 6:
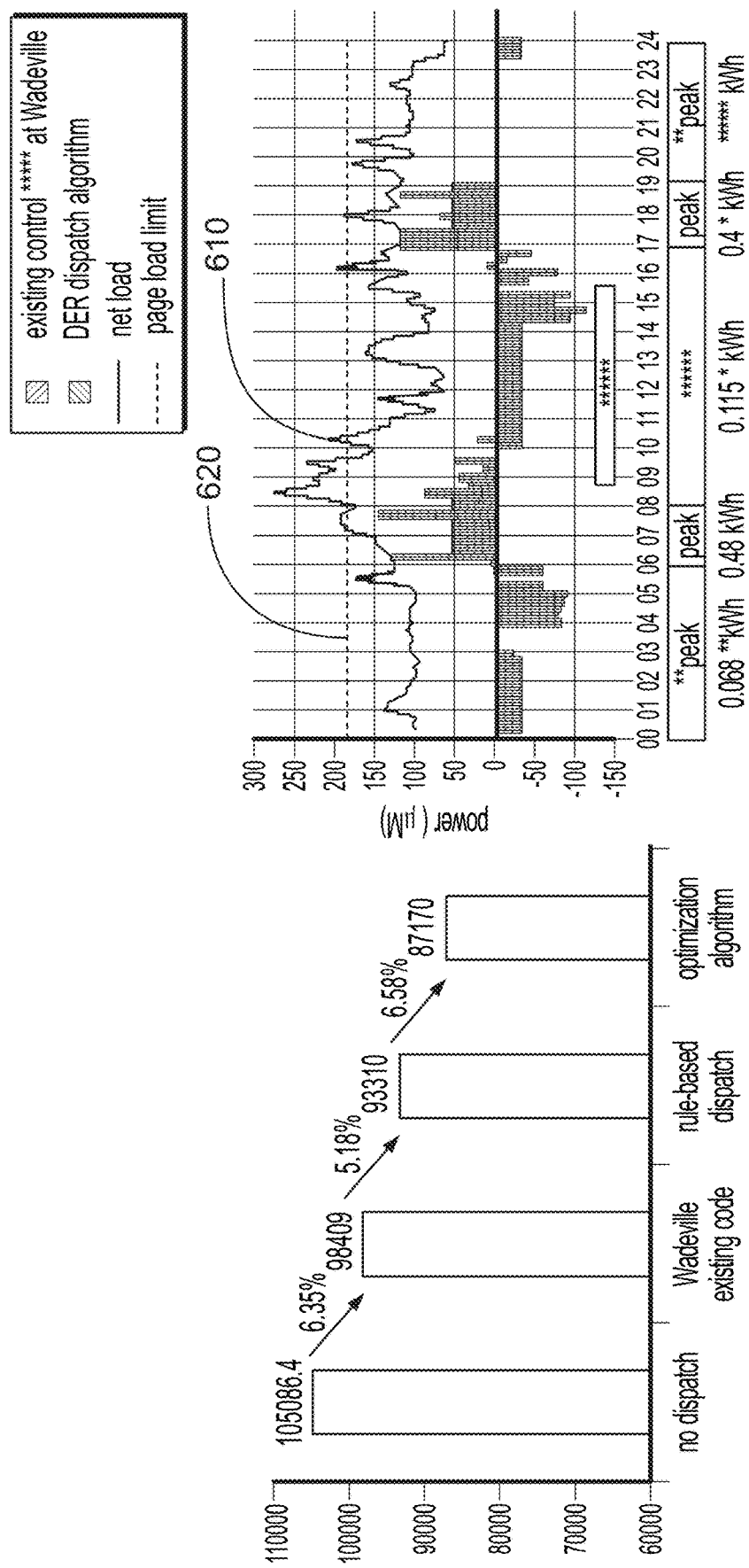
FIG. 6 is a diagram having two graphs illustrating results for an optimal dispatch, relative to other approaches, by simulated operation of an engine system for dispatching and controlling a plurality of DERs over a plurality of implementations, in accordance with an embodiment of the present disclosure.

Referring to FIG. 6, these graphs illustrate results for an optimal dispatch, relative to other approaches, by simulated operation of an engine system for dispatching and controlling a plurality of DERs over a plurality of implementations by way of a deterministic multi-stage optimal dispatch engine system, operable via the hardware-agnostic intelligent control algorithms, in accordance with an embodiment of the present disclosure. A bar graph on the left side of FIG. 6 illustrates a representative cost ($) of power to meet a power demand, e.g., via relative overall power consumption (kW) as a function of approach, wherein a first bar from the left hand side represents an overall a power consumption (kW) in an absence of sending any dispatch to a plurality of DERs, e.g., comprising an electric vehicle charging infrastructure (EVCI), wherein a second bar from the left hand side represents an overall power consumption (kW) by applying a code comprising a time-based algorithm for dispatching commands to a plurality of DERs, wherein a third bar from the left hand side represents an overall power consumption (kW) by applying a rule-based dispatch to a plurality of DERs, and wherein a fourth bar from the left hand side represents an overall power consumption (kW) by applying hardware-agnostic intelligent control algorithms to a plurality of DERs according to embodiments of the present disclosure. The fourth bar indicates that an overall power consumption (kW) is lowest by effecting an optimal dispatch, thereby effecting an additional cost savings of approximately 12% over related art dispatch algorithms, in accordance with embodiments of the present disclosure.

Still referring to FIG. 6, a graph on the right hand side illustrates overall power consumption as a function of time of day, wherein a curve 610 indicates a net load, wherein a broken line 620 indicates a peak load limit, and wherein a gray-shaded bar indicates overall power consumption resulting from application of a DER dispatch algorithm according to embodiments of the present disclosure, and wherein a black-shaded bar indicates overall power consumption resulting from application of a code comprising a time-based algorithm for dispatching commands to a plurality of DERs. The energy cost saved by using embodiments of the present disclosure is approximately 16%.

Referring to FIG. 7A, this schematic diagram illustrates a HiL setup 700a, e.g., a Typhoon® HiL setup for performing a test and validation, in accordance with an embodiment of the present disclosure. The HiL setup comprises: a computer 701 configured to: control a simulation run, monitor peripheral devices, such as a hardware device 702, e.g., a Typhoon® device, and a gateway device 703, e.g., an EATON® SMP SG-4250 substation gateway device configured to operate a rule-based microgrid control algorithm), and host, such as the computer 701 having a data historian (not shown), e.g., a virtual tape device (VTD) data historian, wherein the computer 701 is configured to communicate with the hardware device 702 and the controller 703 in at least one connection of wireline, wireless, and web-based, e.g., via an Ethernet connection. The HiL setup 700a further comprises the hardware device 702 and the controller 703, wherein the hardware device 702 and the controller 703 are configured to communicate with one another via a protocol comprising Modbus over Transmission Control Protocol (ModBus over TCP). The HiL setup 700*a* further comprises a computer platform device 704, e.g., an EATON® SMP SC-2200 computer platform device, wherein the computer platform device and the gateway device 703 are also configured to communicate with one another via a ModBus over TCP. The HiL setup 700*a* further comprises an input/output (I/O) interface 705, the I/O interface 705 configured to communicate with the data historian of the computer 701, e.g., via the hardware device 702, and to communicate with a plurality of powerable entities, e.g., businesses, e.g., worldwide, via a plurality of connections, e.g., connections A, B, and C, wherein the I/O interface 705 is configured to: receive input data, e.g., data defining a Modbus configuration, via Modbus TCP, as indicated by block 705*a*, from the data historian of the computer 701, e.g., via the hardware device 702; and transmit output data to the hardware device 702, via Modbus TCP. The input data defining the Modbus configuration comprises data relating to at least one of an IP address, a net mask, a port, a slave ID, and a register map.

Referring to FIG. 7B, this graph illustrates comparative data of ESS discharge (kW) during peak hours, ESS charge during off-peak hours, ESS charge from excess solar energy, and ESS charge for peak shaving for metered values as a function of an hour of a day and ESS discharge (kW) during peak hours, ESS charge during off-peak hours, ESS charge from excess solar energy, and ESS charge for peak shaving for optimally dispatched set-points as a function of hour of a day, wherein the lower graph portion corresponds to optimally dispatched set-points as dispatched to the DERs, by using the first test and validation process, as shown in FIG. 7A, in accordance with an embodiment of the present disclosure. The upper portion of the graph illustrates the ESS discharge for metered values in relation to various DERs, such as a battery, a utility source, a PV source, a load, and an SoC. The lower portion of the graph illustrates the ESS discharge for optimally dispatched set-points in relation to various DERs, such as a battery, a utility source, a PV source, a load as per the optimally dispatched set-points, a load as per a forecast, and a SoC.

Referring to FIG. 8A, this schematic diagram illustrates a solar energy setup 800 for performing a test and validation, in accordance with an embodiment of the present disclosure. The solar energy setup 800 comprises: an industrial load component 801*a* configured to power by a grid 804, e.g., a macrogrid, a PV grid 802, e.g., a solar PV grid, and a BESS 803.

Referring to FIG. 8B, this a set of photographs illustrates an industrial facility using an industrial load component 801*a* configured to power by a grid 804, e.g., a macrogrid, a PV grid 802, e.g., a solar PV grid, and a BESS 803, as shown in FIG. 8A, in accordance with an embodiment of the present disclosure.

Referring to FIG. 8C, this graph illustrates a weekend power profile resulting from the solar energy setup performing the test and validation, as shown in FIGS. 8A and 8B, in accordance with an embodiment of the present disclosure. The utility lower limit is found to be approximately 25 kW, wherein the PV grid 802 is curtailed to maintain the utility at approximately the utility lower limit, wherein the BESS 803 charges by using excess PV energy (solar power) from the PV grid 802, thereby avoiding reverse power flow.

Referring to FIG. 8D this graph illustrates another weekend power profile resulting from the solar energy setup performing the test and validation, as shown in FIGS. 8A and 8B, in accordance with an embodiment of the present disclosure. The peak limit is found to be approximately 197 kW, wherein the BESS 803 discharges for peak shaving, wherein the utility power is maintained at approximately the peak shaving limit, wherein the battery power us used only for peak shaving, and wherein the entire PV energy (solar power) from the PV grid 802 is consumed by the an industrial facility using an industrial load component 801*a*.

Referring to FIG. 9, this schematic diagram illustrates an implementation of an engine system, e.g., DERMS dispatch engine (DDE) 900, for dispatching and controlling a plurality of DERs operable with various EATON® products, in accordance with an embodiment of the present disclosure. The DDE 900 is configured to operate with at least one of: an UPS 901, e.g., an EATON® Energy Aware® UPS, an ESS 902, e.g., an EATON® XSTORAGE® system, a DER site controller 903, e.g., EATON® an energy automated solution product, and microgrid solution product 904, e.g., an EATON® TURNKEY® microgrid solution product. The DDE 900 further facilitates commercialization opportunities with various product lines to establish predictable and repeatable revenue. For example, the DDE 900 is estimated to provide: a significant value proposition, e.g., approximately 15% energy cost savings through intelligent control of distributed energy resources; and additional revenue potential through optimal participation in grid services.

Referring to FIG. 10 and referring back to FIG. 3, this flow diagram illustrates a method M1 of providing an engine system, e.g., the engine system 350, for dispatching and controlling a plurality of DERs comprising a plurality of microgrids, in accordance with an embodiment of the present disclosure. The method M1 comprises: providing a server 301, as indicated by block 1001; providing a controller 302 configured to operably couple with the server 301 and the plurality of DERs (not shown), as indicated by block 1002; and providing at least one processor (not shown) configured to operably couple with the server 301 and the controller 302, providing the at least one processor comprising configuring the at least one processor to operate the server 301 and the controller 302 in an online mode and an offline mode, providing the at least one processor further comprising configuring the at least one processor, when operating in the offline mode, to: operate the server 301 to perform a first stage optimization by applying a first stage objective function with a first set of constraints to a first set of parameters approximately one month in advance of a given date and time, thereby determining a first stage optimal peak shaving limit; and operate the server 301 to perform a second optimization by applying a second stage objective function with a second set of constraints to a second set of parameters and the first stage optimal peak shaving limit approximately one day in advance of a given date and time, thereby determining a second stage soft constraint and at least one grid service recommendation, and providing the at least one processor further comprising configuring the at least one processor, when operating in the online mode, to: operate the server 301 to perform a third stage optimization by applying a third stage objective function with a third set of constraints to a third set of parameters, the first stage optimal peak shaving limit, the second stage soft constraint, and the least one grid service recommendation approximately one hour in advance of a given date and time, thereby determining a third stage soft constraint and at least one optimal dispatch point; and operate the controller 302 to perform a fourth stage optimization by applying a fourth stage objective function with a fourth set of constraints to a fourth set of parameters, the first stage optimal peak shaving limit, the stage soft constraint, the third stage soft constraint, and the at least one optimal dispatch point approximately in real-time, thereby determining a final set of set-points, as indicated by block 1003, whereby at least one of forecast information and real-time information is providable, operational expense is reducible, and at least one new revenue generation avenue is establishable. By example only, the first optimal peak shaving limit is determined or calculated through the first stage, e.g., by executing an optimal dispatch algorithm one month in advance, wherein subsequent stages, the first optimal peak shaving limits is enforced as a soft constraint, e.g., by executing the optimal dispatch algorithm a day in advance, and hour in advance, and so forth. For example, the time at which the optimal dispatch algorithm is executable comprises any desired "advance time," such as in a range of 1 hour to approximately 24 hours to approximately, e.g., in approximately 1-house increments.

Still referring to FIG. 10 and referring back to FIG. 3, in the method M1, at least one of: providing the controller 302, as indicated by block 1002, comprises providing a programmable logic controller (PLC); and providing at least one processor (not shown), as indicated by block 1003, further comprises configuring the at least one processor to operate the controller 302 to transmit the final set of set-points 302a to the plurality of DERs. In the method M1, at least one of: applying the first stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid+\max(Pgrid)*Dgrid$; applying the second stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$; applying the third stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$; and applying the fourth stage objective function comprises applying a rule-based optimization algorithm, applying the rule-based optimization algorithm comprising basing rules on at least one of node balance and stability of the DERMS.

Referring to FIG. 11 and referring back to FIG. 3, this flow diagram illustrates a method M2 of dispatching and controlling a plurality of DERs comprising a plurality of microgrids by way of an engine system, in accordance with an embodiment of the present disclosure. The method M2 comprises: providing the engine system 350, as indicated by block 1100, providing the engine system 350 comprising: providing a server 301, as indicated by block 1101; providing a controller 302 configured to operably couple with the server 301 and the plurality of DERs (not shown), as indicated by block 1102; and providing at least one processor (not shown) configured to operably couple with the server 301 and the controller 302, providing the at least one processor comprising configuring the at least one processor to operate the server 301 and the controller 302 in an online mode and an offline mode, providing the at least one processor further comprising configuring the at least one processor, when operating in the offline mode, to: operate the server 301 to perform a first stage optimization by applying a first stage objective function with a first set of constraints to a first set of parameters approximately one month in advance of a given date and time, thereby determining a first stage optimal peak shaving limit; and operate the server 301 to perform a second optimization by applying a second stage objective function with a second set of constraints to a second set of parameters and the first stage optimal peak shaving limit approximately one day in advance of a given date and time, thereby determining a second stage soft constraint and at least one grid service recommendation, and providing the at least one processor further comprising configuring the at least one processor, when operating in the online mode, to: operate the server 301 to perform a third stage optimization by applying a third stage objective function with a third set of constraints to a third set of parameters, the first stage optimal peak shaving limit, the second stage soft constraint, and the least one grid service recommendation approximately one hour in advance of a given date and time, thereby determining a third stage soft constraint and at least one optimal dispatch point; and operate the controller 302 to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point approximately in real-time, thereby determining a final set of set-points, as indicated by block 1103, whereby at least one of forecast information and real-time information is providable, operational expense is reducible, and at least one new revenue generation avenue is establishable; and operating the engine system 300, as indicated by block 1104. By example only, the first optimal peak shaving limit is determined or calculated through the first stage, e.g., by executing an optimal dispatch algorithm one month in advance, wherein subsequent stages, the first optimal peak shaving limits is enforced as a soft constraint, e.g., by executing the optimal dispatch algorithm a day in advance, and hour in advance, and so forth. For example, the time at which the optimal dispatch algorithm is executable comprises any desired "advance time," such as in a range of 1 hour to approximately 24 hours to approximately, e.g., in approximately 1-house increments.

Still referring to FIG. 11 and referring back to FIG. 3, in the method M1, at least one of: providing the controller 302, as indicated by block 1102, comprises providing a programmable logic controller (PLC); and providing at least one processor (not shown), as indicated by block 1103, further comprises configuring the at least one processor to operate the controller 302 to transmit the final set of set-points 302a to the plurality of DERs. In the method M1, at least one of: applying the first stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid+\max(Pgrid)*Dgrid$; applying the second stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$; applying the third stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})\Sigma_t Pgridt*Cgrid$; and applying the fourth stage objective function comprises applying a rule-based optimization algorithm, applying the rule-based optimization algorithm comprising basing rules on at least one of node balance and stability of the DERMS.

The subject matter of the present disclosure provides at least one of: a computationally light, robust and scalable multi-stage optimal dispatch engine using an algorithm which captures the advantages of both long-term optimization and short-term forecasting; an algorithm that optimally blends the OpEx reduction and revenue generation to yield maximum benefits; an optimal peak shave or shaving limit for long term forecasting and optimization; an adequate capture of the period for which demand charge is defined; a feature for using battery degradation cost as a proxy to prevent reckless usage of battery; a feature for preserving battery life while deriving maximum benefits; an algorithm which is platform-agnostic, thereby enabling a plug-and-play condition for facilitating portability and compatibility with any platform and a wide range of products; an engine system which is scalable, wherein the same algorithm is adaptable to various microgrid structures at different sites, irrespective of number of sources or load; a feature for recommending grid services, thereby enabling additional revenue generation by participating in such grid services; and a customizable engine system to suit site conditions, wherein the algorithm may be modified to suit different applications, e.g., to add or remove certain features.

Although the above discussion refers to a utility company as being the user who uses the examples of the present disclosure, the present disclosure is not limited to any specific user. In some examples, there may be a plurality of users involved. While some embodiments or aspects of the present disclosure may be implemented in fully functioning computers and computer systems, other embodiments or aspects may be capable of being distributed as a computing product in a variety of forms and may be capable of being applied regardless of the particular type of machine or computer readable media used to actually effect the distribution.

At least some aspects disclosed may be embodied, at least in part, in software and/or firmware. That is, some disclosed techniques and methods may be carried out in a computer system or other data processing system in response to its processor, such as a microprocessor, executing sequences of instructions contained in a memory, such as ROM, volatile RAM, non-volatile memory, cache or a remote storage device.

A computer readable storage medium may be used to store software and data which when executed by a data processing system causes the system to perform various methods or techniques of the present disclosure. The executable software and data may be stored in various places including for example ROM, volatile RAM, non-volatile memory and/or cache. Portions of this software and/or data may be stored in any one of these storage devices.

Examples of computer-readable storage media comprises, but are not limited to, recordable and non-recordable type media such as volatile and non-volatile memory devices, read only memory (ROM), random access memory (RAM), flash memory devices, floppy and other removable disks, magnetic disk storage media, optical storage media, e.g., compact discs (CDs), digital versatile disks (DVDs), etc., among others. The instructions can be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

Furthermore, at least some of the methods described herein may be capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

At least some of the elements of the systems described herein may be implemented by software, or a combination of software and hardware. Elements of the system that are implemented via software may be written in a high-level procedural language such as object oriented programming or a scripting language. Accordingly, the program code may be written in C, C++, J++, or any other suitable programming language and may comprise modules or classes, as in object oriented programming. At least some of the elements of the system that are implemented via software may be written in assembly language, machine language or firmware as needed. In either case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods herein described.

While the teachings described herein are in conjunction with various embodiments for illustrative purposes, it is not intended that the teachings be limited to such embodiments. On the contrary, the teachings described and illustrated herein encompass various alternatives, modifications, and equivalents, without departing from the described embodiments, the general scope of which is defined in the appended claims. Except to the extent necessary or inherent in the processes themselves, no particular order to steps or stages of methods or processes described in this disclosure is intended or implied. In many cases, the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments; and the claims are not limited by anything other than their subject matter, wherein any reference to an element being made in the singular is not intended to denote "one and only one" unless explicitly so stated, but, rather to denote "at least one" or "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public, regardless of whether the element, component, or method step is explicitly recited in the claims. However, that various changes and modifications in form, material, work-piece, and fabrication material detail may be made, without departing from the spirit and scope of the present disclosure, as set forth in the appended claims, are also encompassed by the present disclosure. In addition, any combination or permutation of any feature, as herein explicitly and/or implicitly disclosed, is also encompassed by the present disclosure.

What is claimed:

1. An engine system for dispatching and controlling a plurality of distributed energy resources (DERs) comprising a plurality of microgrids, the engine system comprising:
   a server;
   a controller configured to operably couple with the server and the plurality of DERs; and
   at least one processor configured to operably couple with the server and the controller, the at least one processor configured to operate the server and the controller in an online mode and an offline mode,
   the at least one processor further configured, when operating in the offline mode, to:
   operate the server to perform a first stage optimization by applying a first stage objective function with a first set of constraints to a first set of parameters at a first time of a predetermined time frame, thereby determining a first stage optimal peak shaving limit; and
   operate the server to perform a second optimization by applying a second stage objective function with a second set of constraints to a second set of parameters and the first stage optimal peak shaving limit at a second time of the pre-determined time frame, thereby determining a second stage soft constraint and at least one grid service recommendation, and
   the at least one processor further configured, when operating in the online mode, to:
   operate the server to perform a third stage optimization by applying a third stage objective function with a third set of constraints to a third set of parameters, the first stage optimal peak shaving limit, the second stage soft constraint, and the least one grid service recommendation at a third time of the pre-determined time frame, thereby determining a third stage soft constraint and at least one optimal dispatch point, and
   operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point in real-time, thereby determining a final set of set-points, whereby at least one of forecast information and real-time information is providable, operational expense is reducible, and at least one new revenue generation avenue is establishable, wherein a first interval between the first time and the second time of the pre-determined time frame is greater than a second interval between the second time and the third time, and wherein the second interval between the second time and the third time is greater than a third interval between the second time and the time when the fourth stage optimization is performed.

2. The system of claim 1, wherein the controller comprises a programmable logic controller (PLC).

3. The system of claim 1, wherein the at least one processor is further configured to operate the controller to transmit the final set of set-points to the plurality of DERs.

4. The system of claim 1, wherein the first stage objective function comprises minimization of an expression comprising $\Sigma_t \Sigma_g (Cg*Pgt+NLg*ugt+SUg*vgt+SDg*wgt)+\Sigma_t \Sigma_S (C_{SD}*P_{dt})+\Sigma_t Pgridt*Cgrid+max(Pgrid)*Dgrid$.

5. The system of claim 1, wherein the second stage objective function comprises minimization of an expression comprising $\Sigma_t \Sigma_g (Cg*Pgt+NLg*ugt+SUg*vgt+SDg*wgt)+\Sigma_t \Sigma_S (C_{SD}*P_{dt})+\Sigma_t Pgridt*Cgrid$.

6. The system of claim 1, wherein the third stage objective function comprises minimization of an expression comprising $\Sigma_t \Sigma_g (Cg*Pgt+NLg*ugt+SUg*vgt+SDg*wgt)+\Sigma_t \Sigma_S (C_{SD}*P_{dt})+\Sigma_t Pgridt*Cgrid$.

7. The system of claim 1, wherein the fourth stage objective function comprises a rule-based optimization algorithm, the rule-based optimization algorithm basing rules on at least one of node balance and stability of a distributed energy resource management system (DERMS).

8. A method of providing an engine system for dispatching and controlling a plurality of distributed energy resources (DERs) comprising a plurality of microgrids, the method comprising:
   providing a server;
   providing a controller configured to operably couple with the server and the plurality of DERs; and
   providing at least one processor configured to operably couple with the server and the controller, providing the at least one processor comprising configuring the at least one processor to operate the server and the controller in an online mode and an offline mode,
   providing the at least one processor further comprising configuring the at least one processor, when operating in the offline mode, to:
   operate the server to perform a first stage optimization by applying a first stage objective function with a first set of constraints to a first set of parameters at a first time of a pre-determined time frame, thereby determining a first stage optimal peak shaving limit; and
   operate the server to perform a second optimization by applying a second stage objective function with a second set of constraints to a second set of parameters and the first stage optimal peak shaving limit at a second time of the pre-determined time frame, thereby determining a second stage soft constraint and at least one grid service recommendation, and
   providing the at least one processor further comprising configuring the at least one processor, when operating in the online mode, to:
   operate the server to perform a third stage optimization by applying a third stage objective function with a third set of constraints to a third set of parameters, the first stage optimal peak shaving limit, the second stage soft constraint, and the least one grid service recommendation at a third time of the pre-determined time frame, thereby determining a third stage soft constraint and at least one optimal dispatch point; and
   operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point in real-time, thereby determining a final set of set-points, whereby at least one of forecast information and real-time information is providable, operational expense is reducible, and at least one new revenue generation avenue is establishable, wherein a first interval between the first time and the second time of the pre-determined time frame is greater than a second interval between the second time and the third time, and wherein the second interval between the second time and the third time is greater than a third interval between the second time and the time when the fourth stage optimization is performed.

9. The method of claim 8, wherein providing the controller comprises providing a programmable logic controller (PLC).

10. The method of claim 8, wherein providing the at least one processor further comprises configuring the at least one processor to operate the controller to transmit the final set of set-points to the plurality of DERs.

11. The method of claim 8, wherein applying the first stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid+max(Pgrid)*Dgrid$.

12. The method of claim 8, wherein applying the second stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$.

13. The method of claim 8, wherein applying the third stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$.

14. The method of claim 8, wherein applying the fourth stage objective function comprises applying a rule-based optimization algorithm, applying the rule-based optimization algorithm comprising basing rules on at least one of node balance and stability of a distributed energy resource management system (DERMS).

15. A method of dispatching and controlling a plurality of distributed energy resources (DERs) comprising a plurality of microgrids by way of an engine system, the method comprising:
providing the engine system, providing the engine system comprising:
providing a server;
providing a controller configured to operably couple with the server and the plurality of DERs; and
providing at least one processor configured to operably couple with the server and the controller, providing the at least one processor comprising configuring the at least one processor to operate the server and the controller in an online mode and an offline mode,
providing the at least one processor further comprising configuring the at least one processor, when operating in the offline mode, to:
operate the server to perform a first stage optimization by applying a first stage objective function with a first set of constraints to a first set of parameters at a first time of a pre-determined time frame, thereby determining a first stage optimal peak shaving limit; and
operate the server to perform a second optimization by applying a second stage objective function with a second set of constraints to a second set of parameters and the first stage optimal peak shaving limit at a second time of the pre-determined time frame, thereby determining a second stage soft constraint and at least one grid service recommendation, and
providing the at least one processor further comprising configuring the at least one processor, when operating in the online mode, to:
operate the server to perform a third stage optimization by applying a third stage objective function with a third set of constraints to a third set of parameters, the first stage optimal peak shaving limit, the second stage soft constraint, and the least one grid service recommendation at a third time of the pre-determined time frame, thereby determining a third stage soft constraint and at least one optimal dispatch point; and
operate the controller to perform a fourth stage optimization by applying a fourth stage objective function with a fourth set of constraints to a fourth set of parameters, the first stage optimal peak shaving limit, the second stage soft constraint, the third stage soft constraint, and the at least one optimal dispatch point in real-time, thereby determining a final set of set-points,
whereby at least one of forecast information and real-time information is providable, operational expense is reducible, and at least one new revenue generation avenue is establishable, wherein a first interval between the first time and the second time of the pre-determined time frame is greater than a second interval between the second time and the third time, and wherein the second interval between the second time and the third time is greater than a third interval between the second time and the time when the fourth stage optimization is performed; and
operating the engine system.

16. The method of claim 15, wherein at least one of: providing the controller comprises providing a programmable logic controller (PLC); and providing the at least one processor further comprises configuring the at least one processor to operate the controller to transmit the final set of set-points to the plurality of DERs.

17. The method of claim 15, wherein applying the first stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid+max(Pgrid)*Dgrid$.

18. The method of claim 15, wherein applying the second stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$.

19. The method of claim 15, wherein applying the third stage objective function comprises minimizing an expression comprising $\Sigma_t\Sigma_g(Cg*Pgt+NLg*ugt+SUg*vgt+SDg*wgt)+\Sigma_t\Sigma_s(C_{SD}*P_{dt})+\Sigma_t Pgridt*Cgrid$.

20. The method of claim 15, wherein applying the fourth stage objective function comprises applying a rule-based optimization algorithm, applying the rule-based optimization algorithm comprising basing rules on at least one of node balance and stability of a distributed energy resource management system (DERMS).

* * * * *